United States Patent
Shalaby et al.

(10) Patent No.: US 12,372,450 B1
(45) Date of Patent: Jul. 29, 2025

(54) HYBRID FREE SPACE ACOUSTIC OSCILLATORS FOR ULTRAPRECISION SENSOR APPLICATIONS

(71) Applicant: IMAM MOHAMMAD IBN SAUD ISLAMIC UNIVERSITY, Riyadh (SA)

(72) Inventors: Mohamed Yehia Mohamed Shalaby, Riyadh (SA); Abdulrahman M. Shalaby, Kajang (MY)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/096,069

(22) Filed: Mar. 31, 2025

(51) Int. Cl.
- *G01N 9/34* (2006.01)
- *G01B 17/02* (2006.01)
- *G01K 11/22* (2006.01)
- *G01N 9/00* (2006.01)

(52) U.S. Cl.
CPC ............. *G01N 9/002* (2013.01); *G01B 17/02* (2013.01); *G01K 11/22* (2013.01)

(58) Field of Classification Search
CPC ...... G01N 11/16; G01N 29/07; G01N 29/036; G01N 29/04; G01N 29/11; G01N 2291/014; G01N 9/002; G01B 17/00; G01B 17/02; G01K 11/26; G01K 11/22
See application file for complete search history.

(56) References Cited

U.S. PATENT DOCUMENTS

| | | | | |
|---|---|---|---|---|
| 3,771,355 A | * | 11/1973 | Sachs | ................... G01S 7/52025 |
| | | | | 73/599 |
| 5,425,272 A | * | 6/1995 | Rhodes | ................... G01N 29/30 |
| | | | | 73/579 |
| 10,454,421 B2 | | 10/2019 | Nicholls | |
| 11,855,416 B2 | | 12/2023 | Yoffe | |
| 2022/0352687 A1 | | 11/2022 | Shafak et al. | |

OTHER PUBLICATIONS

Yosef London, et al., "Electro-opto-mechanical radio-frequency oscillator driven by guided acoustic waves in standard single-mode fiber", APL Photonics, vol. 2, Issue 4, Mar. 9, 2017, pp. 041303-1 to 041303-7. 8 pages.
"Linear Technology LT1222", LT, L TC and L TM are registered trademarks of Linear Technology Corporation. C-Load is a trademark of Linear Technology Corporation. www.linear.com, 12 pages.

* cited by examiner

*Primary Examiner* — Tarun Sinha
(74) *Attorney, Agent, or Firm* — Oblon, McClelland, Maier & Neustadt, L.L.P.

(57) ABSTRACT

A hybrid free-space acoustic oscillator system and method for detecting perturbations in a free-space region by analyzing phase-induced frequency shifts. An acoustic transmitter is configured to emit signals at a preset oscillation frequency into the free-space region, where a sample under test induces phase shifts. An acoustic receiver captures the phase-shifted signals and converts them into electrical signals. A first and second feedback loop interconnect the receiver and transmitter, incorporating a first amplifier, a bandpass filter, and phase shifters to regulate signal characteristics. The system dynamically compensates for induced phase variations through controlled feedback adjustments. A detector measures the difference between the preset and new oscillation frequency to determine a property of the sample under test.

20 Claims, 21 Drawing Sheets

HYBRID FREE SPACE ACOUSTIC OSCILLATORS FOR ULTRAPRECISION SENSOR APPLICATIONS

BACKGROUND

Technical Field

The present disclosure is directed to hybrid free space acoustic oscillators for ultraprecision sensor applications.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Accurate and high-resolution sensing technologies are required across various industrial, environmental, and infrastructural applications. Existing sensor technologies, particularly those used for monitoring physical parameters such as thickness, tilt angle, temperature, pressure, and structural integrity, often suffer from limitations that hinder their precision, safety, and cost-effectiveness. Conventional sensor designs primarily rely on measuring signal amplitude or phase along a single trajectory between a transmitter and a receiver. However, such systems generally lack the necessary sensitivity to detect minute variations in the medium under inspection, thereby restricting their utility in ultraprecision sensing applications.

A common approach to non-contact sensing involves nuclear-based systems, such as gamma-ray and X-ray thickness gauges. While these technologies are capable of penetrating materials and providing quantitative assessments, they present inherent safety risks due to radiation exposure. Regulatory constraints and environmental concerns surrounding the use of radioactive materials further limit their applicability, requiring stringent compliance measures and controlled disposal procedures. These limitations pose significant challenges for widespread adoption, particularly in environments where human safety and regulatory approval are key concerns.

Other conventional non-nuclear sensors, such as ultrasound-based and optical sensing systems, are widely used for industrial monitoring applications. However, these sensors are constrained by several challenges, including sensitivity limitations that prevent them from detecting minute changes in material properties, calibration and stability issues that require frequent recalibrations to maintain accuracy over time, high operational and maintenance costs that reduce their feasibility for large-scale industrial adoption, and environmental sensitivity where external factors such as temperature fluctuations, pressure variations, and material heterogeneity introduce errors in sensor readings, affecting reliability.

Advancements in acoustic sensing have demonstrated significant potential in overcoming the aforementioned limitations. Free-space acoustic oscillators have emerged as a promising technology due to their ability to transform small phase variations into significant frequency shifts, enabling highly sensitive and precise detection of changes in the medium under test. Existing research has explored various configurations of hybrid oscillators that integrate mechanical, optical, and acoustic elements to enhance sensitivity and robustness. For example, research on micromechanical and opto-acoustic resonators has demonstrated their potential for ultraprecision frequency control, but challenges remain in optimizing stability, scalability, and adaptability for real-world applications.

Hybrid acoustic oscillators have been explored in numerous studies for their application in sensing and frequency control. Lee et al. [See: J. E.-Y. Lee, B. Bahreyni, Y. Zhu, and A. A. Seshia, "*A Single-Crystal-Silicon Bulk-Acoustic-Mode Microresonator Oscillator,*" in IEEE Electron Device Letters, vol. 29, no. 7, pp. 701-703, July 2008, doi: 10.1109/LED.2008.2000643] demonstrated a micromechanical resonator with a high-quality factor, showcasing its potential for precision applications. Sridaran and Bhave [See: S. Sridaran and S. A. Bhave, "1.12 *GHz Opto-Acoustic Oscillator,*" 2012 IEEE 25th International Conference on Micro Electromechanical Systems (MEMS), Paris, France, 2012, pp. 664-667, doi: 10.1109/MEMSYS.2012.6170274] explored opto-acoustic oscillators achieving GHz-range frequencies with improved phase stability, but their reliance on optoelectronic components presents integration challenges for broader applications. Gosavi and Bhave [See: T. A. Gosavi and S. A. Bhave, "*Magneto-acoustic oscillator,*" 2017 19th International Conference on Solid-State Sensors, Actuators and Microsystems (TRANSDUCERS), Kaohsiung, Taiwan, 2017, pp. 448-451, doi: 10.1109/TRANSDUCERS.2017.7994083] introduced a magneto-acoustic oscillator, integrating spin torque oscillators with bulk acoustic resonators to reduce phase noise. While these advancements provide a strong foundation, current implementations lack adaptability for multi-variable sensing in free-space environments.

U.S. Pat. No. 10,454,421B2 describes an optoelectronic oscillator electronically tunable filter for transposing narrow pass band characteristics of a surface acoustic wave (SAW) filter to a microwave frequency. A laser is connected to a Mach-Zehnder modulator which transmits the laser signal through an optical delay element. A photodetector receives the laser signal and transmits it through a feedback path comprising an amplifier, a bandpass filter, and a voltage-controlled phase shifter. The circuit is used to tune a frequency of the microwave transmitter and does not include a free-space path which can be used for sensing.

Non-patent literature reference, titled "Electro-opto-mechanical radio-frequency oscillator driven by guided acoustic waves in standard single-mode fiber," describes an optoelectronic radio-frequency oscillator that is based on forward scattering by the guided acoustic modes of a standard single-mode optical fiber. An optical pump wave is used to stimulate narrowband, resonant guided acoustic modes, which introduce phase modulation to a co-propagating optical probe wave. This reference appears to have probes for sensing but does not appear to include the change in frequency or phase shift in the feedback loop.

Each of the aforementioned suffers from inadequacy of high-precision sensing in addressing the aforementioned limitations. Conventional sensor systems, particularly those reliant on amplitude or phase-based measurements, fail to dynamically compensate for real-time environmental variations, limiting their effectiveness in industrial, environmental, and scientific applications. The lack of scalable and adaptable sensing solutions further restricts their widespread adoption in cost-sensitive and safety-critical industries.

Accordingly, it is one object of the present disclosure to provide methods and systems for enhancing the sensitivity, adaptability, and reliability of acoustic sensing technologies in free-space environments.

SUMMARY

In an exemplary embodiment, a hybrid free space acoustic oscillator system for sensing perturbations in a free space region is described, which includes an acoustic transmitter configured to transmit a series of signals at a preset oscillation frequency into the free space region and a sample under test located in the free space region. The series of signals are phase shifted from the preset oscillation frequency by perturbations of the sample under test, an acoustic receiver is configured to receive the phase shifted series of signals and convert the phase shifted series of signals to electrical signals. The system further includes a first feedback loop, a second feedback loop connected between the acoustic receiver and the acoustic transmitter and a first amplifier located in the first feedback loop. The first amplifier is configured to receive the electrical signals and amplify the electrical signals by a gain value A. A bandpass filter is connected to the first amplifier, wherein the bandpass filter is configured to filter the amplified the electrical signals of the first feedback loop to a desired frequency band and a first phase shifter is connected to the bandpass filter. The first phase shifter is configured to inject a first phase shift into the amplified electrical signals of the first feedback loop. The first phase shift is configured to adjust a frequency of the amplified electric signals to the desired frequency band. The system further includes a second phase shifter located in the second feedback loop. The second phase shifter is configured inject a second phase shift into the second feedback loop. The second phase shift is configured to adjust the preset oscillation frequency to a new oscillation frequency to compensate for the phase shifts in the preset oscillation frequency induced by the sample under test.

The system further includes a second amplifier connected to the second phase shifter. The second amplifier is configured to amplify the electrical signals of the second feedback loop phase shifted by the second phase shifter. The system further includes a detector connected to the first feedback loop and the second feedback loop. The detector is configured to measure a difference between the preset oscillation frequency and the new oscillation frequency and determine a property of the sample under test.

In another exemplary embodiment, a method for sensing perturbations in a free space region of a hybrid free space acoustic oscillator system which includes transmitting, with an acoustic transmitter, a series of signals at a preset oscillation frequency into the free space region, phase shifting, by a sample under test located in the free space region, the series of signals from the preset oscillation frequency by perturbations of the sample under test, receiving, by an acoustic receiver, the phase shifted series of signals, and converting, by the acoustic receiver, the phase shifted series of signals to electrical signals. The method includes connecting a first feedback loop and a second feedback loop between the acoustic receiver and the acoustic transmitter, amplifying, by a first amplifier located in the first feedback loop, the electrical signals by a gain value A, filtering, with a bandpass filter connected to the first amplifier, the amplified the electrical signals of the first feedback loop to a desired frequency band, and injecting, by a first phase shifter connected to the bandpass filter, a first phase shift into the amplified electrical signals of the first feedback loop to adjust a frequency of the amplified electric signals to the desired frequency band.

The method further includes injecting, by a second phase shifter located in the second feedback loop, a second phase shift into the second feedback loop to adjust the preset oscillation frequency to a new oscillation frequency to compensate for the phase shifts in the preset oscillation frequency induced by the sample under test, amplifying, by a second amplifier connected to the second phase shifter, the electrical signals of the second feedback loop phase shifted by the second phase shifter, and measuring, by a detector connected to the first feedback loop and the second feedback loop, a difference between the preset oscillation frequency and the new oscillation frequency to determine a property of the sample under test, wherein the detector is one of a detector configured to generate a spectrum of the electrical signals and a mixer configured to compare the new oscillation frequency to a reference signal.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
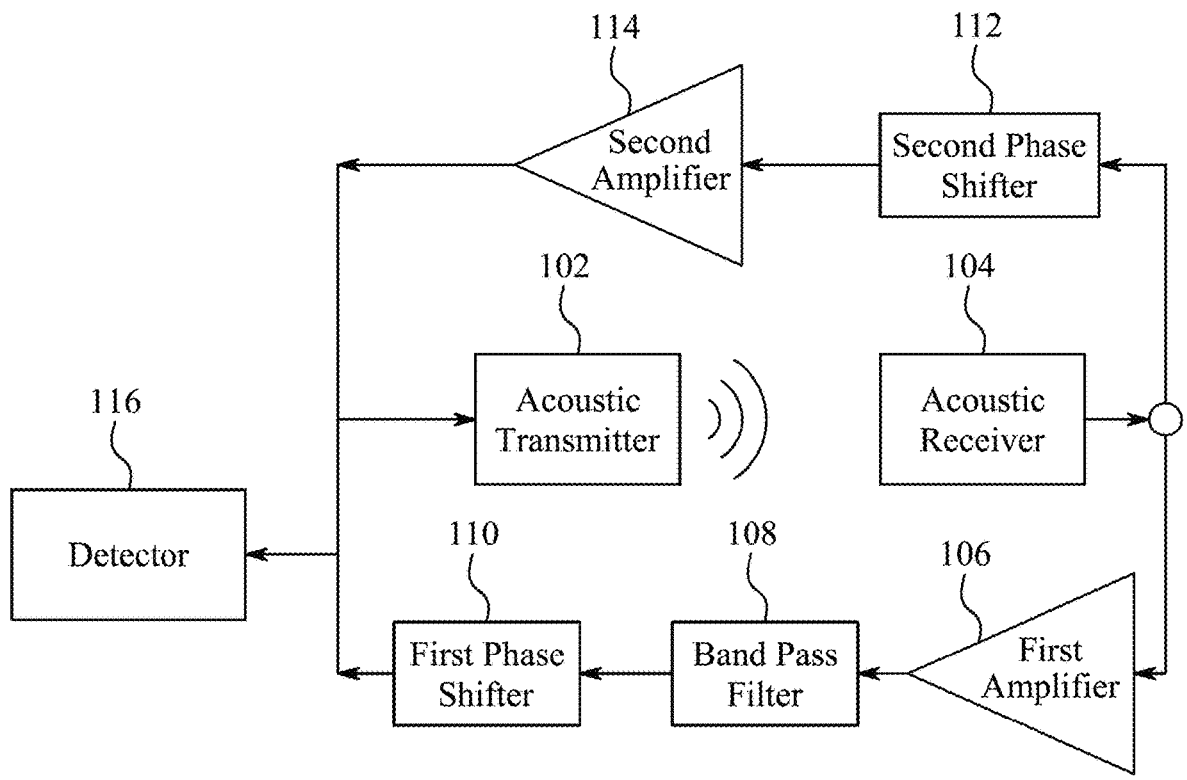
FIG. 1A illustrates a first configuration of a hybrid free-space acoustic oscillator system configured to sense perturbations in a free-space region, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to a hybrid free space acoustic oscillator system for ultraprecision sensor applications. Conventional sensing techniques for environmental parameters, material characterization, and thickness measurements often suffer from limitations, such as low sensitivity, complex implementation, and susceptibility to external noise. Existing methods lack the ability to efficiently detect and quantify minute variations in environmental conditions or material properties using a compact and adaptable system.

The hybrid free space acoustic oscillator system addresses the challenges by transforming phase variations experienced by an acoustic wave into measurable frequency shifts. The system consists of an acoustic transmitter, an acoustic receiver, phase-shifting components, a bandpass filter, and a summing circuit, configured within feedback loops to sustain stable oscillations. The system is capable of detecting variations in parameters, such as temperature, density, pressure, tilt angle, and material thickness by analyzing deviations in the oscillation frequency.

FIG. 1A illustrates a hybrid free-space acoustic oscillator system 100 configured to sense perturbations in a free-space region. The hybrid free-space acoustic oscillator system, referred to as a system 100 alternatively, comprises an acoustic transmitter 102, an acoustic receiver 104, a first feedback loop, a second feedback loop, and various processing components designed to facilitate high-precision sensing by transforming phase variations into measurable frequency shifts.

The acoustic transmitter 102 is an ultrasonic transducer configured to emit a series of acoustic waves at a preset oscillation frequency into the free-space region. The acoustic transmitter 102 may be a piezoelectric transducer, a capacitive micromachined ultrasonic transducer (CMUT), or any other transducer capable of generating controlled acoustic waves.

The acoustic waves interact with a sample under test, which may include a gaseous medium, a liquid sample, or a solid object positioned within the propagation path of the acoustic waves. The sample under test is located in the free space region, where the series of signals are phase shifted from the preset oscillation frequency by perturbations of the sample under test. Variations in the properties of the sample under test, such as changes in gas density, temperature fluctuations, or modifications in the structural characteristics of a solid sample, induce phase shifts in the propagating acoustic waves.

The acoustic receiver 104 is a sensor element configured to receive the phase shifted series of acoustic signals that propagates through the free space region after being transmitted by the acoustic transmitter 102, and then converts the phase shifted series of signals to electrical signals. The acoustic receiver 104 is configured to transmit a first half of the electrical signals into the first feedback loop and transmit a second half of the electrical signals into the second feedback loop.

The acoustic receiver 104 may be a piezoelectric sensor, a laser Doppler vibrometer, or a capacitive ultrasonic sensor, depending on the application requirements. The acoustic signals interact with the sample under test, which induces phase shifts and other modulations due to variations in properties such as density, temperature, thickness, or tilt angle. The acoustic receiver 104 detects the modified signals and transforms them into corresponding electrical signals that are subsequently processed within the first and second feedback loops.

The first feedback loop and the second feedback loop are connected between the acoustic receiver 104 and the acoustic transmitter 102. The first feedback loop includes a first amplifier 106, a bandpass filter 108, and a first phase shifter 110.

The first amplifier 106 is an operational amplifier or a low-noise amplifier configured to receive the electrical signals from the acoustic receiver 104 and amplify the electrical signals by a gain value A. The first amplifier 106 further amplifies the signal returning through the feedback loop, compensating for any inherent losses during wave propagation. The first amplifier 106 is a level adjustment circuit. The level adjustment circuit, in various configurations, is configured to maintain stable oscillation conditions by regulating the amplitude and phase of the oscillating signal. The level adjustment circuit may be implemented as an amplifier or a voltage divider circuit.

Particularly, the first amplifier 106 is implemented as a gain control amplifier configured to regulate the amplitude of the signal within the free-space acoustic oscillator system. With implementation of the first amplifier 106, the oscillations are sustained by compensating for any attenuation that may occur due to variations in the propagation medium or system losses. The first amplifier 106 amplifies the received signal to a level sufficient for stable oscillation while maintaining the required amplitude conditions. The first amplifier 106 may also be configured as an operational amplifier circuit with a predefined gain, wherein the gain is adjusted based on external circuit parameters, such as resistance and capacitance values. The first amplifier 106 may be configured to prevent signal degradation and maintain oscillatory behavior by dynamically adjusting the gain in response to changes in the oscillation conditions.

Figure 1B:
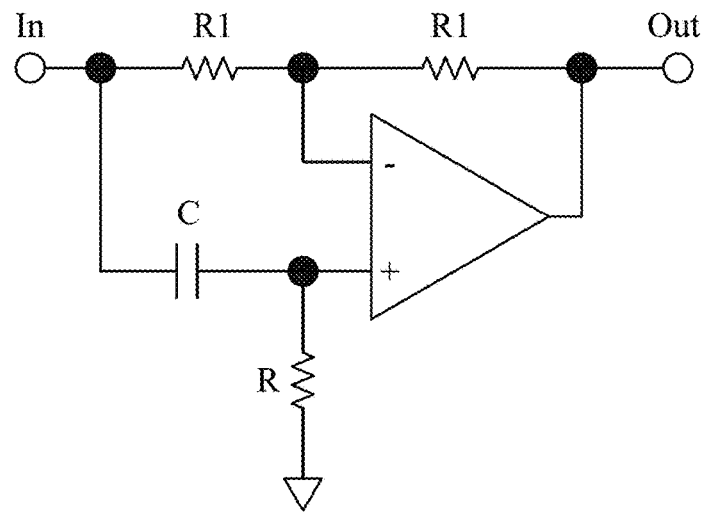
FIG. 1B illustrates a first-order all-pass filter circuit configured to provide a lead-lag phase shift, according to certain embodiments.
Figure 1C:
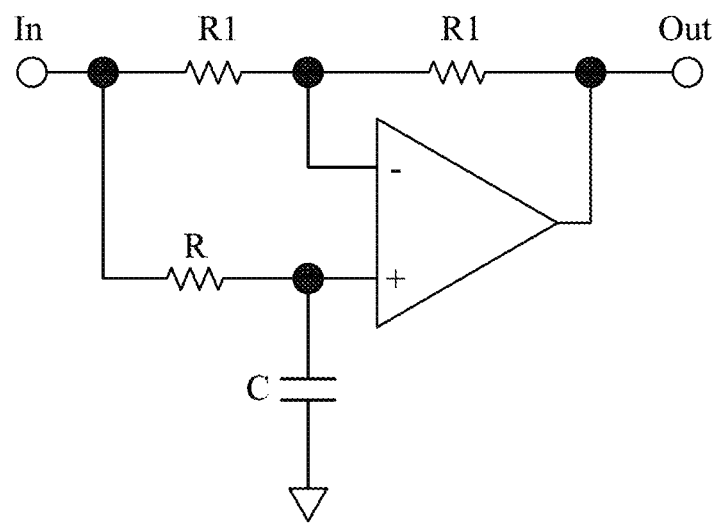
FIG. 1C illustrates a first-order all-pass filter circuit configured to provide a lag-lead phase shift, according to certain embodiments.
Figure 1D:
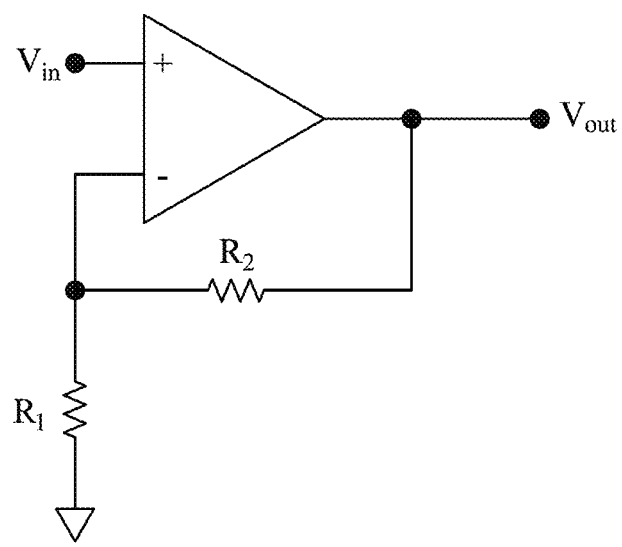
FIG. 1D illustrates a circuit diagram of an amplifier, according to certain embodiments.

FIG. 1D illustrates a circuit diagram of an amplifier. The circuit diagram illustrates a configuration of various amplifiers implemented within the system 100 and various system embodiments. The amplifier is a non-inverting amplifier implemented using a high-speed operational amplifier (op-amp). The non-inverting amplifier is configured to provide voltage gain while preserving the phase of the input signal. The circuit consists of an operational amplifier with its non-inverting input terminal receiving an input voltage Vin. A voltage divider network, composed of a first resistor $R_1$ and a second resistor $R_2$, is implemented in the feedback loop to regulate the gain of the amplifier. The output voltage $V_{out}$ is derived from the output terminal of the operational amplifier.

The voltage gain A of the amplifier is determined by the ratio of two resistors in its feedback network and is given by:

$$\frac{V_{out}}{V_{in}} = 1 + \frac{R_2}{R_1}$$

where $R_1$ and $R_2$ are the resistors defining the closed-loop gain of the first amplifier 106.

In a non-limiting example, to ensure a balance between power efficiency and stability, $R_1$ is chosen to be between 100Ω and 1 kΩ, while $R_2$ is selected from a range of about 1 kΩ to about 100 kΩ, yielding a gain as large as 1000.

In one example, the amplifier may be a high-speed operational amplifier which exhibits low distortion and high bandwidth, making it suitable for the high-frequency oscillation required in the system. In a non-limiting example, the operational amplifier may be an LT1222, manufactured by Linear Technology, Milpitas, California, U.S.A. The circuit diagram illustrated through FIG. 1D depicts the first and second amplifiers implemented in various configurations as described in subsequent disclosure.

Referring back to FIG. 1A, the bandpass filter 108 is connected to the first amplifier 106. The bandpass filter 108 is configured to receive an amplified signal from the first amplifier 106 and filter the amplified signals of the first feedback loop to a desired frequency band. The bandpass filter 108 is integrated within the free-space acoustic oscillator system 100 to selectively transmit oscillation frequency components while attenuating unwanted noise. By defining the frequency response of the oscillator, the bandpass filter 108 stabilizes the oscillation frequency, mitigating variations arising from environmental fluctuations, such as temperature, density, and pressure changes. The bandpass filter 108 operates in conjunction with the first phase shifter 110 to introduce controlled phase modifications, compensating for phase variations induced by environmental factors. Together, the bandpass filter 108 and the first phase shifter regulate the spectral characteristics of the oscillating signal, maintaining feedback conditions essential for stable oscillations. By filtering unwanted spectral components and preserving signal purity, the bandpass filter 108 enhances system accuracy and sensitivity in detecting variations in the free-space medium.

The first phase shifter 110 is connected to the bandpass filter 108 and may be an all-pass filter. The first phase shifter 110 is configured to inject a first phase shift into the amplified electrical signals of the first feedback loop, thereby adjusting the frequency of the signals within the desired frequency band. The first phase shift is configured to adjust a frequency of the amplified electric signals to the desired frequency band.

The second feedback loop includes a second phase shifter 112 and a second amplifier 114. The second phase shifter 112 is a tunable electronic component, such as a voltage-controlled phase shifter, configured to introduce a secondary phase shift into the electrical signals within the second feedback loop.

The second amplifier 114 is a controlled gain amplifier or an adjustable attenuator designed to amplify the phase-shifted electrical signals in the second feedback loop. The circuit diagram and the components of the second amplifier 114 are same as illustrated in FIG. 1D.

The second amplifier 114 is configured to receive the electrical signals that have undergone a second phase shift and amplify these signals to a predetermined gain value. The gain of the second amplifier 114 may be fixed at a gain value K, in one aspect. In another aspect, the gain of the second amplifier 114 is adjustable. The gain value is dependent on the application requirements, such that the amplified signal maintains a defined amplitude ratio with respect to the electrical signals in the first feedback loop.

The second amplifier 114 is positioned within the second feedback loop to facilitate compensation for phase perturbations introduced by variations in the sample under test. These phase perturbations arise due to environmental fluctuations or modifications in the physical properties of the medium occupying the free-space region. By amplifying the phase-shifted signal, the second amplifier 114 aids in stabilizing the oscillation conditions within the feedback system, thereby contributing to the accurate detection of frequency deviations caused by changes in the sample properties.

The second phase shifter 112 is configured inject a second phase shift into the second feedback loop, where the second phase shift is configured to adjust the preset oscillation frequency to a new oscillation frequency to compensate for the phase shifts in the preset oscillation frequency induced by the sample under test. The phase shifting component Φ1 of the first phase shifter 110 and the phase shifting component Φ2 of the second phase shifter 112 are configured with the phase shift networks and are designed to introduce controlled phase modifications within the oscillation signal. The phase shifting components Φ1 and Φ2 regulate the phase relationship between the transmitted and received acoustic signals, thereby contributing to the stabilization of the feedback loop within the free-space acoustic oscillator. The phase shifting components Φ1 and Φ2 may be implemented as all-pass filter circuits that modify the phase response while maintaining the amplitude characteristics of the oscillation signal. The first phase shifter 110 and the second phase shifter 112 ensure that the phase shifts of the first feedback loop and the second feedback loop match before being received by the acoustic transmitter 102 and the detector 116.

The phase shifting component Φ1 is implemented within the first feedback loop to regulate the phase shift prior to signal amplification, while the phase shifting component Φ2 is positioned within the second feedback loop to dynamically adjust the oscillation frequency, thereby sustaining system stability. Additionally, the phase shifting components Φ1 and Φ2 are tunable all-pass filters that control the phase delay in the feedback loop.

FIG. 1B illustrates a first-order all-pass filter circuit configured to provide a lead-lag phase shift. In one configuration, the phase shift (Φ1 and Φ2) may be implemented to introduce a phase shift that increases from 0° to 180° as the frequency increases, also referred to as a positive phase shifting. The circuit comprises an operational amplifier, a resistor R, and a capacitor C, arranged in a feedback configuration. The input signal is applied at the terminal IN, while the output signal is extracted at the terminal OUT.

The capacitor C is connected to the input current source of the operational amplifier, whereas the resistor R is connected between the non-inverting input and the ground potential. A first resistor $R_1$ is connected between the input current source and the inverting input. A second resistor $R_1$ is connected between the output and the inverting input. The operational amplifier is configured to process the signal such that the phase shift introduced by the circuit varies between 0° and 180°, depending on the input signal frequency. By adjusting the values of R and C, the circuit can be tuned to provide a specific phase response over a desired frequency range. Such configuration is implemented in phase compensating networks where a lead-lag phase shift is required.

FIG. 1C illustrates a first-order all-pass filter circuit configured to provide a lag-lead phase shift. In alternate configuration, the phase shifts (Φ1 and Φ2) may be implemented to introduce a phase shift that decreases from 180° to 0° as frequency increases. The circuit consists of an operational amplifier, a resistor R, and a capacitor C arranged within a feedback network.

The resistor R is connected between the non-inverting input of the operational amplifier and the input signal IN, while the capacitor C is positioned between the non-inverting input and ground. The placement of the capacitor C in this manner results in a phase shift that decreases from 180° to 0° as the frequency of the input signal increases. By adjusting the values of R and C, the circuit can be tuned to provide a specific phase response over a desired frequency range. Such configuration is implemented in phase-cancellation applications or when a delayed phase response is needed.

The two circuits shown in FIG. B and FIG. C serve the same function and they can be used as phase shifters in any of the proposed configurations. However, they differ in the phase shift they introduce. In FIG. B, the phase shift is given by $\Phi=\pi-2\tan^{-1}(\omega RC)$ resulting in a phase shift in the range $(\pi, 0)$. In FIG. 1C, the phase shift is given by $\Phi=-2\tan^{-1}(\Phi RC)$ producing a phase shift in the range $(0, \pi)$. The circuit achieves maximum phase sensitivity at $\Phi RC=1$. In a non-limiting example, a center frequency of 1 MHz is achieved by using the component values of $R=100\Omega$, and $C=2$ nF.

Referring back to FIG. 1A, the detector 116 is connected to the first feedback loop and the second feedback loop. The detector 116 is configured as a spectrum analyzer. The spectrum analyzer generates a frequency spectrum of the electrical signals of the first half of the electrical signals and the second half of the electrical signals of the second feedback path, determine the difference between the preset oscillation frequency and the new oscillation frequency and determine the property of the sample under test based on the difference. The detector 116 may be a swept-tuned detector, a spectrum analyzer, a mixer having a reference frequency input, a real-time detector, or a fast Fourier transform (FFT)-based detector, depending on the precision and resolution required for analysis.

The hybrid free-space acoustic oscillator system 100 is configured for applications in gas sensing, temperature monitoring, thickness monitoring, tilt angle monitoring and structural material analysis. When the sample under test is a gaseous medium, the system 100 determines the gas density by detecting frequency shifts caused by variations in acoustic wave propagation. The perturbations in the free space path are due to changes in the density of the gas. The spectrum analyzer is configured to detect the shift in frequency to the new oscillation frequency resulting from the changes in the density of the gas.

When the sample under test is air or a gas, the system 100 is configured to measure temperature variations by analyzing oscillation frequency changes due to thermal expansion or contraction of the air or gas molecules. For the air sample, the property is a temperature of the air or gas and the perturbations in the free space path are due to changes in the temperature of the air or gas. The spectrum analyzer is configured to detect the shift in frequency to the new oscillation frequency resulting from the changes in the temperature of the air or gas.

When the sample under test is a solid slab, the system 100 detects changes in material thickness or tilt angle based on phase shift deviations resulting from modifications in the propagation path of the acoustic waves.

The feedback loop configuration of the system 100 ensures that even minor variations in phase experienced by the acoustic wave during propagation through the free-space region lead to significant and measurable changes in the oscillation frequency.

Figure 2A:
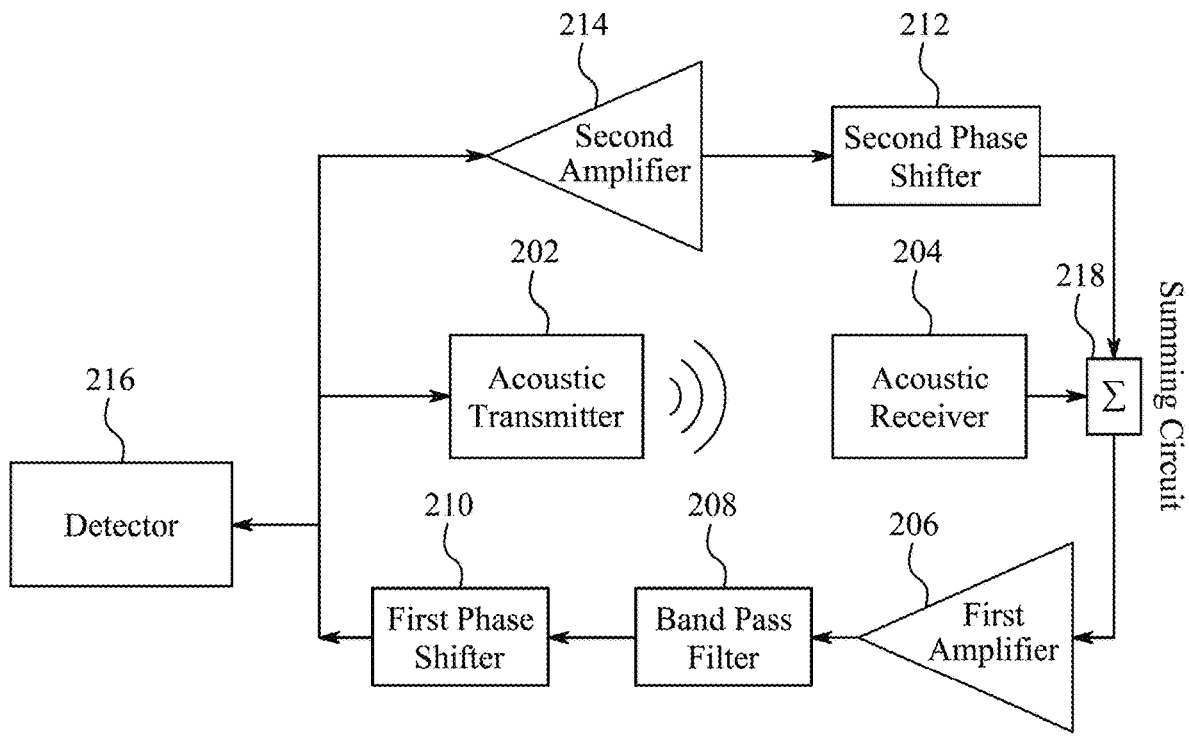
FIG. 2A illustrates a second configuration of the hybrid free-space acoustic oscillator system configured to sense perturbations in a free space region, according to certain embodiments.

FIG. 2A illustrates a second configuration of a hybrid free space acoustic oscillator system 200 implemented for sensing perturbations in a free space region. The hybrid free space acoustic oscillator system 200 includes multiple components that work together to measure changes in the medium occupying the free space region.

The hybrid free space acoustic oscillator system 200 includes an acoustic transmitter 202 implemented to transmit a series of signals at a preset oscillation frequency into the free space region. The acoustic transmitter 202 is configured to emit acoustic waves that propagate through the free space path and interact with a sample under test. The sample under test is implemented within the free space region and introduces phase shifts in the transmitted series of signals, which are caused by perturbations in the medium characteristics of the sample under test.

An acoustic receiver 204 is implemented to receive the phase-shifted series of signals that have propagated through the free space region. The acoustic receiver 204 is implemented to convert the received signals into electrical signals. The hybrid free space acoustic oscillator system 200 further comprises a first feedback loop and a second feedback loop implemented between the acoustic receiver 204 and the acoustic transmitter 202. The feedback loops play a role in maintaining oscillations and dynamically adjusting the frequency based on phase shifts in the medium under test.

A first amplifier 206, a representation of the first amplifier 106 of FIG. 1, is implemented within the first feedback loop and is configured to receive the electrical signals from the acoustic receiver 204. The first amplifier 206 amplifies the received electrical signals by a gain value A, so that the signal strength remains sufficient for further processing. The amplified electrical signals are then transmitted to a bandpass filter 208. The bandpass filter 208 is implemented to filter the amplified electrical signals to isolate a desired frequency band.

A first phase shifter 210, a representation of the first phase shifter 110 of FIG. 1, is connected to the bandpass filter 208 and is implemented to inject a first phase shift into the filtered and amplified electrical signals.

A second phase shifter 212, a representation of the second phase shifter 112 of FIG. 1, is implemented in the second feedback loop and is configured to inject a second phase shift into the second feedback loop. The second phase shift adjusts the preset oscillation frequency to a new oscillation frequency in response to the phase shifts induced by the sample under test in the free space region.

The second feedback loop further includes a second amplifier 214. The second amplifier 214 is implemented to regulate the amplitude of the electrical signals in the second feedback loop. In one implementation, the second amplifier 114 includes a voltage divider circuit. The second amplifier 114 allows for precise control of the signal gain to optimize the response of the oscillator system to environmental perturbations. The second amplifier 114 has an adjustable gain value $1/\alpha$. The gain value $1/\alpha$ is configured to be adjusted to match the amplitude of the electrical signals in the second feedback loop to an amplitude of the electrical signals in the first feedback loop.

Figure 2B:
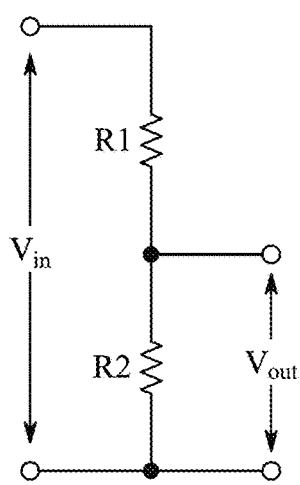
FIG. 2B is a circuit diagram of a voltage divider circuit, according to certain embodiments.

FIG. 2B illustrates a voltage divider circuit configured to adjust the amplitude of an input signal before it is combined with another signal within the system. The voltage divider consists of a first resistor $R_1$ and a second resistor $R_2$ connected in series between an input voltage Vin and ground. The output voltage $V_{out}$ is obtained at the junction of $R_1$ and $R_2$, effectively scaling the input voltage according to the ratio of the resistors.

The voltage divider circuit is implemented to regulate the amplitude of an input signal before its combination with another signal, thereby facilitating optimal signal processing in subsequent stages of the system. The voltage divider circuit is structured using resistive components configured to scale the input signal according to a predetermined ratio. The ratio is mathematically defined by the equation:

$$V_{out} = V_{in} \frac{R_2}{R_1 + R_2}$$

where $R_1$ and $R_2$ represent the resistive elements that determine the scaling factor applied to the input voltage Vin, producing an output voltage $V_{out}$ with a reduced amplitude.

Figure 2C:
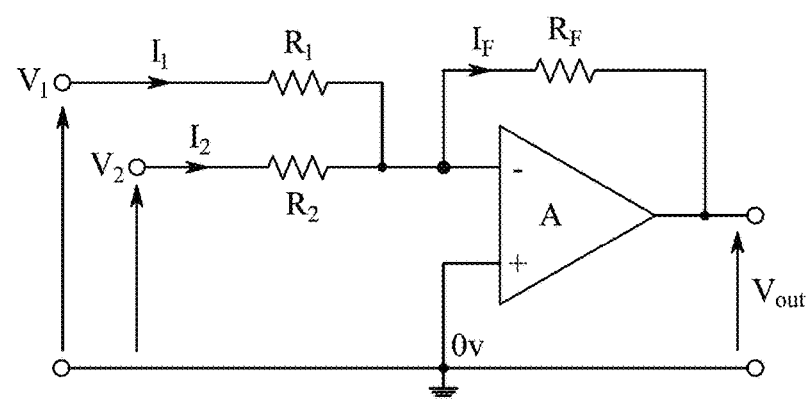
FIG. 2C is a circuit diagram of a summing circuit, according to certain embodiments.

Referring back to FIG. 2A, a summing circuit 218 is implemented within the system 200 and is configured to receive electrical signals from the first feedback loop and the second feedback loop. The summing circuit 218 is connected to the acoustic receiver 204, the first feedback loop, and the second feedback loop. The summing circuit 218 is configured to receive the electrical signals from the acoustic receiver, sum the electrical signals from the acoustic receiver with the amplified, second phase shifted electrical signals from the second feedback loop having the new oscillation frequency and inject the sum of the electric signals into the first feedback loop. The second amplifier has a variable gain of $1/\alpha$, where a is a tuneable parameter. FIG. 2C illustrates a summing amplifier circuit configured to combine multiple input signals while applying a controlled amplification factor to the resulting output signal. The summing amplifier includes an operational amplifier A arranged in an inverting configuration, with multiple input resistors and a feedback resistor RF that collectively determine the gain characteristics of the circuit. The circuit receives input signals V1 and V2, which are individually attenuated by resistors $R_1$ and $R_2$, respectively, before being summed at the inverting terminal of the operational amplifier A.

In operation, the summing amplifier circuit of FIG. 2C is representative of the summing circuit and utilizes the principle of virtual ground at the inverting terminal, ensuring that the sum of the currents I1 and I2 contributed by the input signals is equal to the feedback current IF. This results in an output voltage $V_{out}$ given by the following equation:

$$V_{out} = -V_1 \frac{R_F}{R_1} - V_2 \frac{R_F}{R_2}$$

where $V_{out}$ represents the amplified sum of the input signals.

The summing amplifier configuration is implemented within the system to facilitate signal processing operations where multiple signals must be merged into a single output while maintaining proportional weighting. By appropriately selecting the resistor values, the circuit is adaptable to various applications, including signal conditioning, waveform synthesis, and weighted signal summation in feedback loops.

Referring back to FIG. 2A, a detector 216, a representation of the detector 116 of FIG. 1, is connected to the first feedback loop and the second feedback loop. The detector 216 is configured to as a spectrum analyzer to generate a frequency spectrum of the summed electrical signals received from the first feedback loop and the second feedback loop. In this configuration, the detector 216 is a spectrum analyzer which generates a spectrum of the frequencies of the output signal received from the first phase shifter 210. The oscillation frequency of the system is compared to the present frequency generated by the acoustic transmitter 202. A computing device can be connected to the spectrum analyzer to determine the shift in frequency and match the shift in frequency to a physical parameter of the sample or medium in the free space propagation path.

In an example, where the sample under test is a gas, the property measured is a density of the gas. The perturbations in the free space path are due to changes in the density of the gas. The spectrum analyzer is configured to detect the shift in frequency to the new oscillation frequency resulting from the changes in the density of the gas.

In another example, where the sample under test is air or gas, the property measured is a temperature of the air or gas and the perturbations in the free space path are due to changes in the temperature of the air or gas. The spectrum analyzer is configured to detect the shift in frequency to the new oscillation frequency resulting from the changes in the temperature of the air or gas.

In operation, the hybrid free space acoustic oscillator system 200 transmits an acoustic wave into the free space region where the sample under test is present. The interaction of the wave with the sample causes perturbations that introduce phase shifts in the transmitted wave. The first feedback loop and the second feedback loop dynamically adjust the frequency of the oscillations to compensate for the phase shifts induced by the sample under test. The summing circuit 218 ensures that the signal processing remains stable, while the detector 216 precisely measures the frequency shift to determine the property of the sample under test.

Figure 3:
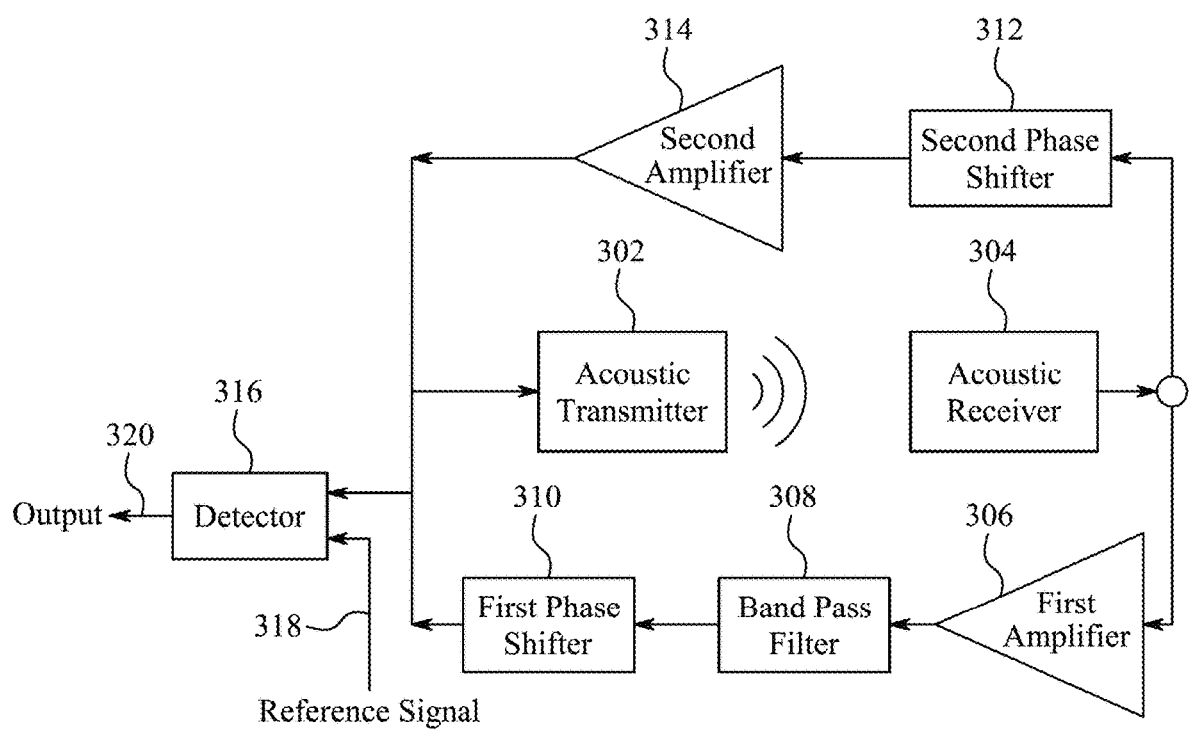
FIG. 3 illustrates a third configuration of the hybrid free space acoustic oscillator system configured to sense perturbations in a free space region, according to certain embodiments.

FIG. 3 illustrates a third configuration of a hybrid free space acoustic oscillator system 300 configured to sense perturbations in a free space region by transforming phase shifts induced by a sample under test into corresponding frequency shifts. The hybrid free space acoustic oscillator system 300 comprises an acoustic transmitter 302, an acoustic receiver 304, a first feedback loop, and a second feedback loop.

The acoustic transmitter 302 is implemented to transmit a series of acoustic signals at a preset oscillation frequency into the free space region. A sample under test is implemented in the free space region, causing perturbations in the propagation of the acoustic signals. The sample under test may include gaseous, liquid, or solid materials that introduce phase shifts in the transmitted acoustic signals due to variations in density, temperature, or structural properties. The variations in the medium alter the propagation characteristics of the acoustic signals, leading to a phase shift from the preset oscillation frequency.

The acoustic receiver 304, coupled to the acoustic transmitter 302, is configured to receive the phase-shifted acoustic signals after they have propagated through the free space region containing the sample under test. The acoustic receiver 304 is configured to convert the received acoustic signals into corresponding electrical signals. The electrical signals carry phase variations that reflect changes in the sample under test.

The first feedback loop and the second feedback loop connect the acoustic receiver 304 and the acoustic transmitter 302. The first and second feedback loops are configured to maintain oscillations and dynamically adjust the frequency in response to phase variations introduced by the sample under test.

The first amplifier 306, a representation of the first amplifiers (106, 206), is implemented in the first feedback loop to receive the electrical signals from the acoustic receiver 304. The first amplifier 306 is configured to amplify the electrical signals by a gain value A so that the signal strength remains within the desired range for further processing.

A bandpass filter 308, a representation of the bandpass filter (108, 208), is implemented in the first feedback loop and is configured to filter the amplified electrical signals received from the first amplifier 306 to a desired frequency band. The bandpass filter 308 selectively allows frequency components within a specified range to pass while attenuating other frequency components.

The first phase shifter 310, a representation of the first phase shifters (110, 210), is implemented in the first feedback loop and is configured to inject a first phase shift into the amplified electrical signals received from the bandpass filter 308. The first phase shift is configured to adjust the frequency of the amplified electrical signals to match the desired frequency band determined by the bandpass filter 308.

A second phase shifter 312, a representation of the second phase shifters (112, 212), is implemented in the second feedback loop and is configured to inject a second phase shift into the electrical signals received from the acoustic receiver 304 within the second feedback loop. The second phase shift is configured to adjust the preset oscillation frequency to a new oscillation frequency to compensate for the phase shifts induced by the sample under test.

The second amplifier 314, representative of the second amplifier 114 of FIG. 1A, is implemented in the second feedback loop to amplify the electrical signals phase-shifted by the second phase shifter 312. The second amplifier 314 is implemented having a fixed gain element K so that the signals maintain a stable amplitude as they propagate through the feedback loop.

The hybrid free space acoustic oscillator system further comprises a detector 316 implemented to compare the new oscillation frequency of the electrical signals from the second feedback loop with a reference signal 318. The detector 316 in this aspect, is a mixer implemented to compare the new oscillation frequency with a frequency of a reference signal 318. Rather than generating a spectrum, the mixer outputs the frequency shift as a result of changes in properties of the medium. The mixer operates by combining the oscillation signal with a reference signal, producing an output that represents the difference in frequency between the two. The detector may include a computing device which matches the frequency difference to a database record or a lookup table stored in memory to determine the property of the sample under test.

The reference signal 318, in one example, is a sinusoidal waveform with a frequency that is predetermined through a calibration process conducted prior to the deployment of the oscillator as a sensor. The reference signal 318 is subject to adjustment based on the specific requirements and operational conditions of the intended application. The adaptability of the reference signal 318 facilitates functionality of the oscillator across diverse environments. Additionally, the reference signal 318 is required to maintain stability over extended periods to uphold accuracy and reliability of the sensor in detecting frequency shifts induced by variations in the surrounding medium. For an acoustic oscillator, the reference signal frequency is calibrated to about 1 MHz.

The detector 316 functions as a mixer. The detector 316 is configured to compare the new oscillation frequency of the electrical signals with the reference signal 318. The reference signal 318 is predetermined during a calibration process.

The detector 316 receives the electrical signals from the first feedback loop, the second feedback loop, and the reference signal 318, and compares the new oscillation frequency of the electrical signals of the first half of the electrical signals and the second half of the electrical signals of the second feedback path to a reference frequency. The detector 316 then outputs a comparison result indicating a frequency shift corresponding to a difference between the new oscillation signal and the reference signal 318, thereby determining a property of the sample under test. The output 320 of the detector 316 represents the detected variation in oscillation frequency corresponding to changes in the sample under test.

The detector 316 is also configured to determine specific properties of the sample under test based on the frequency shift. In one example, the sample under test is a gas, and the property measured is the density of the gas. The perturbations in the free space path are due to changes in the density of the gas. The detector 316, configured as the mixer, outputs a frequency shift between the reference frequency and the new oscillation frequency resulting from the changes in the density of the gas.

In another aspect, the sample under test is air, and the property measured is the temperature of the air. The perturbations in the free space region are due to changes in air temperature, which influence the acoustic wave velocity. The detector 316 measures the resulting frequency shift and outputs the corresponding variation at output 320.

Figure 4:
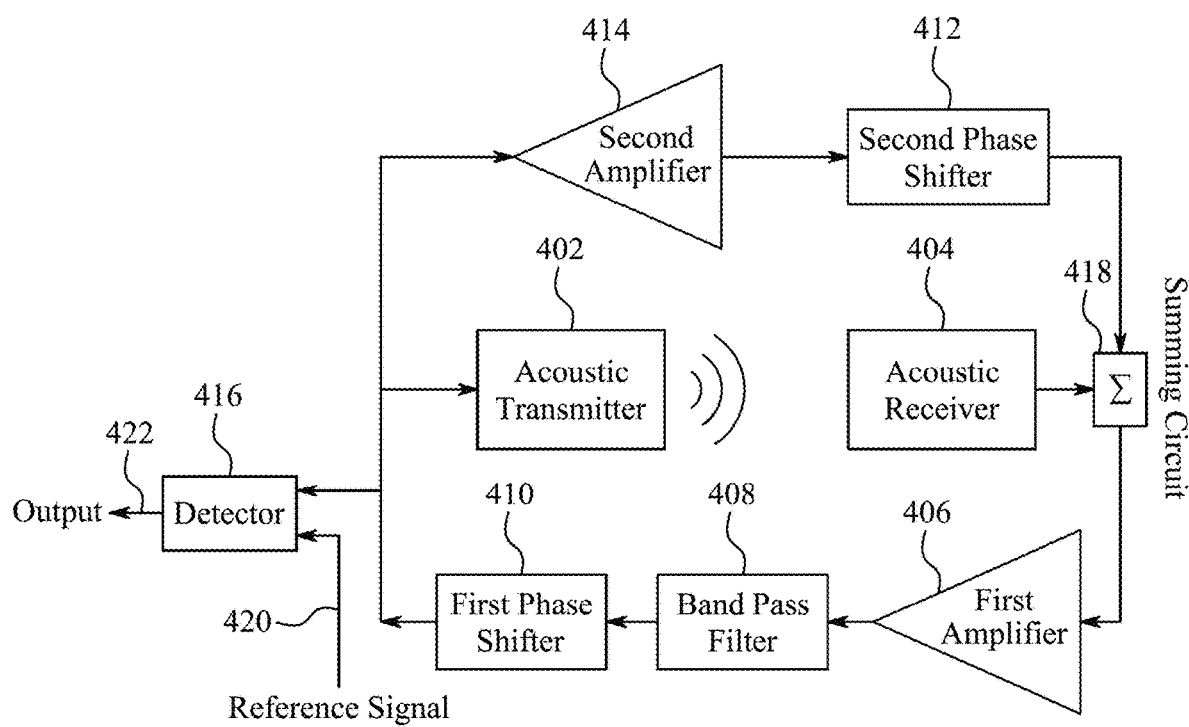
FIG. 4 illustrates a fourth configuration of the hybrid free space acoustic oscillator system configured to sense perturbations in a free space region, according to certain embodiments.

FIG. 4 illustrates a hybrid free space acoustic oscillator system 400 configured to sense perturbations in a free space region by transforming phase shifts induced by a sample under test into corresponding frequency shifts. The hybrid free space acoustic oscillator system 400 comprises an acoustic transmitter 402, an acoustic receiver 404, a first feedback loop, and a second feedback loop.

The acoustic transmitter 402 is implemented to transmit a series of acoustic signals at a preset oscillation frequency into the free space region. A sample under test is implemented in the free space region, causing perturbations in the propagation of the acoustic signals. The sample under test may include gaseous, liquid, or solid materials that introduce phase shifts in the transmitted acoustic signals due to variations in density, temperature, or structural properties. The variations in the medium alter the propagation characteristics of the acoustic signals, leading to a phase shift from the preset oscillation frequency.

The acoustic receiver 404 is implemented to receive the phase-shifted acoustic signals after they have passed through the free space region containing the sample under test. The acoustic receiver 404 is configured to convert the received acoustic signals into corresponding electrical signals. The electrical signals carry phase differences that reflect changes in the sample under test.

A summing circuit 418 is implemented to combine the electrical signals from the acoustic receiver 404 with the second phase shifted from the second feedback loop. The summed electrical signals are then injected into the first feedback loop.

The system 400 further comprises the first feedback loop and the second feedback loop, which connect the acoustic receiver 404 and the acoustic transmitter 402. The first feedback loop and the second feedback loop are configured to maintain oscillations and dynamically adjust the frequency in response to phase variations introduced by the sample under test.

The first amplifier 406, a representation of the first amplifiers (106, 206, 306), having a gain A, is implemented in the first feedback loop to receive the summed electrical signals from the summing circuit. The first amplifier 406 is configured to amplify the summed electrical signals by the gain value A to ensure that the signal strength remains within the desired range for further processing. The gain value may be preset or set during calibration of the circuit and may vary depending on the characteristics of the sample under test.

A bandpass filter 408, a representation of the bandpass filters (108, 208, 308), is implemented in the first feedback loop and is configured to filter the amplified electrical signals to a desired frequency band. The bandpass filter 408 selectively allows frequency components within a specified range to pass while attenuating other frequency components.

A first phase shifter 410, a representation of the first phase shifters (110, 210, 310) is implemented in the first feedback loop and is configured to inject a first phase shift into the amplified electrical signals. The first phase shift is configured to adjust the frequency of the amplified electrical signals to match the desired frequency band determined by the bandpass filter 408.

A second phase shifter 412, a representation of the second phase shifters (112, 212, 312) is implemented in the second feedback loop and is configured to inject a second phase shift into the second feedback loop. The second phase shift is configured to adjust the preset oscillation frequency to a new oscillation frequency to compensate for the phase shifts induced by the sample under test.

A second amplifier 414, a representation of the second amplifier of FIG. 2, having an adjustable gain coefficient $1/\alpha$, is implemented in the second feedback loop and is configured to adjust the gain value of the amplified electrical signals in the second feedback loop. The second amplifier 414 matches the amplitude of the electrical signals in the second feedback loop to the amplitude of the electrical signals in the first feedback loop. In one implementation, the second amplifier 414 is a voltage divider circuit. The second amplifier 414 allows for precise control of the signal gain to optimize the response of the oscillator system to environmental perturbations.

The signals generated at the acoustic receiver 104 are electrical signals in response to the phase shift in the acoustic signals received. Therefore, the signals passing through the first feedback loop and the second feedback loop are electrical signals. The electrical signals drive the acoustic transmitter 402 to generate the acoustic signals. The electrical signals are received by the detector 416 from the first phase shifter 410.

The hybrid free space acoustic oscillator system 400 further comprises the detector 416 implemented to compare the new oscillation frequency of the summed electrical signals from the first feedback loop with a reference signal 420.

The detector 416, a representation of the detector 316, is configured to output a frequency shift corresponding to a difference between the new oscillation frequency and the preset oscillation frequency, thereby determining a property of the sample under test. In this aspect, the detector 416 is configured as a mixer. The detector 416 is connected to the first feedback loop to receive the electrical signal. The detector 416, i.e., the mixer, is configured to compare the new oscillation frequency of the summed electrical signals of the first feedback loop and the second feedback loop to a reference frequency and determine the difference between the reference frequency and the new oscillation frequency to determine a property of the sample under test based on the difference.

The output 422 of the detector 416 represents the detected variation in oscillation frequency corresponding to changes in the sample under test.

The detector 416 is further configured to determine specific properties of the sample under test based on the frequency shift. In one example, the sample under test is a gas, and the property measured is the density of the gas. The density of the gas affects the propagation speed of the acoustic signals, leading to a measurable phase shift in the received signals. The detector 416 measures the shift in frequency corresponding to changes in gas density and outputs the detected variation at output 422.

In another example, the sample under test is air, and the property measured is the temperature of the air. The perturbations in the free space region are due to changes in air temperature, which influence the acoustic wave velocity. The detector 416 measures the resulting frequency shift and outputs the corresponding variation at output 422.

In another implementation, the hybrid free space acoustic oscillator system 400 is configured to measure a reference frequency shift using the detector 416. The detector 416 functions as a mixer, configured to compare the new oscillation frequency of the summed electrical signals with the reference signal 420. The reference signal 420 is predetermined during a calibration process. The detector 416 outputs the frequency shift between the new oscillation frequency and the reference signal 420, allowing precise tracking of environmental or material variations.

The detector 416 may include a computing device configured to match the frequency difference to a database record or a lookup table stored in memory to determine the property of the sample under test.

Figure 5:
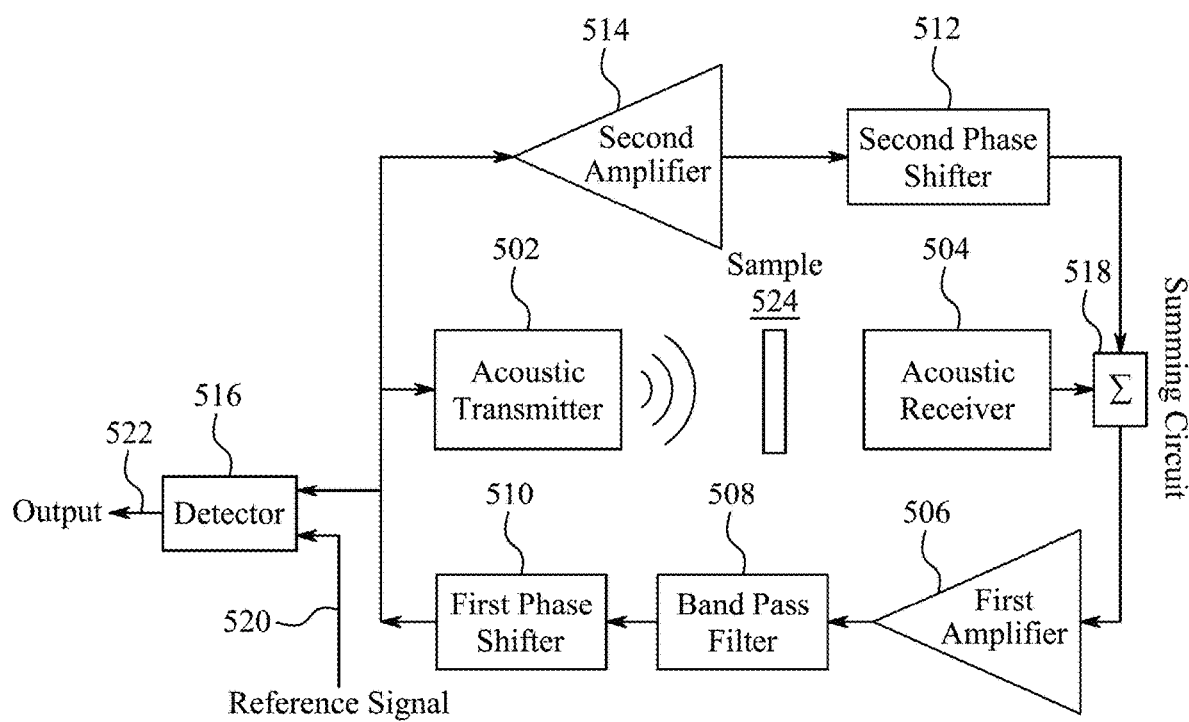
FIG. 5 illustrates a fifth configuration of the hybrid free space acoustic oscillator system configured to sense perturbations in a free space region, according to certain embodiments.

FIG. 5 illustrates a hybrid free space acoustic oscillator system 500 configured for real-time thickness monitoring in a manufacturing process. The hybrid free space acoustic oscillator system 500 is implemented to detect changes in the thickness of a sample under test by measuring frequency deviations in an oscillation signal.

In this aspect, the hybrid free space acoustic oscillator system 500 comprises an acoustic transmitter 502, an acoustic receiver 504, a first feedback loop, and a second feedback loop. The acoustic transmitter 502 is implemented to transmit a series of acoustic signals at a preset oscillation frequency into a free space region. A sample under test is implemented in the free space region. The sample under test is a material whose thickness is to be measured in real-time during the manufacturing process. The acoustic signals are phase-shifted by the sample under test as the thickness of the sample under test varies.

The acoustic receiver 504 is implemented to receive the phase-shifted acoustic signals after they pass through the free space region containing the sample under test. The acoustic receiver 504 is configured to convert the received acoustic signals into corresponding electrical signals. The phase shift in the received acoustic signals reflects the variations in the thickness of the sample under test.

The hybrid free space acoustic oscillator system 500 further comprises a first feedback loop and a second feedback loop that connect the acoustic receiver 504 and the acoustic transmitter 502. The first feedback loop and the second feedback loop are configured to maintain oscillations and dynamically adjust the frequency in response to the phase variations introduced by the sample under test.

A summing circuit 518 is implemented to combine the electrical signals from the acoustic receiver 504 with the second phase shifted from the second feedback loop. The summed electrical signals are then injected into the first feedback loop.

A first amplifier 506, a representation of the first amplifiers (106, 206, 306, 406), is implemented in the first feedback loop and is configured to receive the electrical signals from the acoustic receiver 504. The first amplifier 506 is configured to amplify the electrical signals by a gain value A to ensure that the signal strength remains within the desired range for further processing. The gain value may be preset or set during calibration of the circuit and may vary depending on the characteristics of the sample under test.

A bandpass filter 508, a representation of the bandpass filter (108, 208, 308, 408) is implemented in the first feedback loop and is configured to filter the amplified electrical signals to a desired frequency band. The bandpass filter 508 selectively allows frequency components within a specified range to pass while attenuating other frequency components.

A first phase shifter 510, a representation of the first phase shifters (110, 210, 310, 410) is implemented in the first feedback loop and is configured to inject a first phase shift into the amplified electrical signals. The first phase shift is configured to adjust the frequency of the amplified electrical signals to match the desired frequency band determined by the bandpass filter 508.

A second phase shifter 512, a representation of the second phase shifters (112, 212, 312, 412) is implemented in the second feedback loop and is configured to inject a second phase shift into the second feedback loop. The second phase shift is configured to adjust the preset oscillation frequency to a new oscillation frequency to compensate for the phase shifts induced by the sample under test.

A second amplifier 514, a representation of the second amplifiers (214, 414), having an adjustable gain coefficient $1/\alpha$, is implemented in the second feedback loop and is configured to adjust the gain value of the amplified electrical signals in the second feedback loop. The second amplifier 514 matches the amplitude of the electrical signals in the second feedback loop to the amplitude of the electrical signals in the first feedback loop. In one implementation, the second amplifier 414 is a voltage divider circuit. The second amplifier 414 allows for precise control of the signal gain to optimize the response of the oscillator system to environmental perturbations.

The hybrid free space acoustic oscillator system 500 further comprises a detector 516, (representative of the detectors 316, 416), implemented to compare the new oscillation frequency of the summed electrical signals from the first feedback loop with a reference signal 520. The detector 516 is configured to output a frequency shift corresponding to a difference between the new oscillation frequency and the preset oscillation frequency, thereby determining the thickness of the sample under test. The output 522 of the detector 516 represents the detected variation in oscillation frequency corresponding to changes in the thickness of the sample under test.

The hybrid free space acoustic oscillator system 500 is configured to determine the thickness of the sample under test in real-time. The sample, i.e., a slab, is located in the free space path. The property measured is a thickness of the slab. As the sample under test undergoes changes in thickness during the manufacturing process, the phase shift in the propagated acoustic signals varies accordingly. The detector 516 is configured to output a frequency shift between the reference frequency and the new oscillation frequency resulting from the changes in the thickness of the sample under test. The detector 516 may include a computing device configured to match the frequency difference to a database record or a lookup table stored in memory to determine the property of the sample under test.

Figure 6:
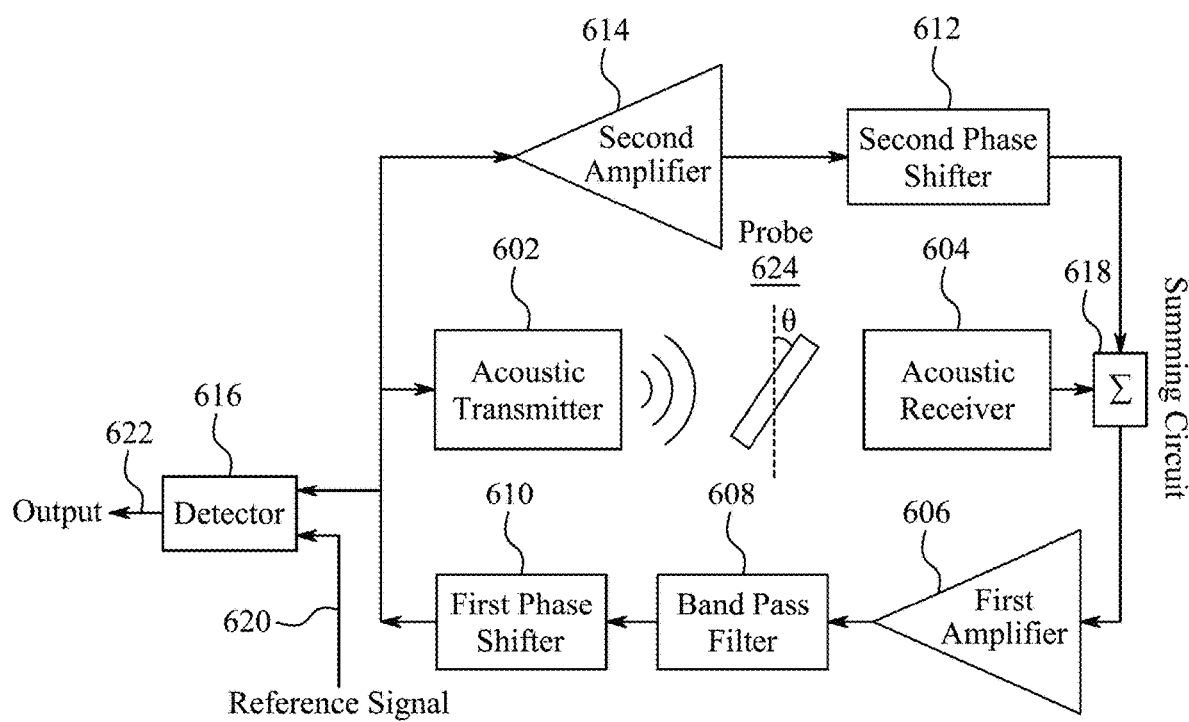
FIG. 6 illustrates a sixth configuration of the hybrid free space acoustic oscillator system configured to sense perturbations in a free space region, according to certain embodiments.

FIG. 6 illustrates a hybrid free space acoustic oscillator system 600 configured to measure the tilt angle of a slab. In an operation, the system 600 is configured to determine the tilt angle of a slab 624 positioned within the free-space region of the oscillator. The slab, alternatively referred to as a probe 624, is oriented at a variable tilt angle relative to the axis of the free-space region, introducing phase perturbations in the acoustic wave propagating through the medium due to changes in the path length. The system 600 processes the oscillation frequency shift caused by variations in the tilt angle.

An initial oscillation signal is propagated through the free-space region containing the slab 624. Due to the tilt of the slab 624, the acoustic wave undergoes a phase shift, altering the oscillation frequency of the system. The modified signal is captured, which is subsequently processed through a dual feedback loop comprising phase-shifting and amplification elements. The new oscillation frequency is compared with a reference frequency, thereby quantifying the frequency deviation caused by the tilt angle.

The system 600 comprises an acoustic transmitter 602, an acoustic receiver 604, a first feedback loop, and a second feedback loop. The acoustic transmitter 602 is implemented to transmit a series of acoustic signals at a preset oscillation frequency into a free space region. The probe 624, composed of a known slab with predetermined specifications, is implemented in the free space region. The probe 624 is positioned such that its tilt angle causes variations in the horizontal path traversed by the acoustic signals.

The acoustic receiver 604 is implemented to receive the phase-shifted acoustic signals after passing through the free space region containing the probe 624. The acoustic receiver 604 is configured to convert the received acoustic signals into corresponding electrical signals. The phase shift in the received acoustic signals reflects the variations in the tilt angle of the probe 624.

The system 600 further comprises a first feedback loop and a second feedback loop that connect the acoustic receiver 604 and the acoustic transmitter 602. The first feedback loop and the second feedback loop are configured to maintain oscillations and dynamically adjust the frequency in response to the phase variations introduced by the probe 624.

A summing circuit 618 is implemented to combine the electrical signals from the acoustic receiver 604 with the second phase shifted from the second feedback loop. The summed electrical signals are then injected into the first feedback loop.

A first amplifier 606, a representation of the first amplifiers (106, 206, 306, 406, 506), is implemented in the first feedback loop and is configured to receive the electrical signals from the acoustic receiver 604. The first amplifier 606 is configured to amplify the electrical signals by a gain value A to ensure that the signal strength remains within the desired range for further processing.

A bandpass filter 608, a representation of the bandpass filter (108, 208, 308, 408, 506) is implemented in the first feedback loop and is configured to filter the amplified electrical signals to a desired frequency band. The bandpass filter 608 selectively allows frequency components within a specified range to pass while attenuating other frequency components.

A first phase shifter 610, a representation of the first phase shifters (110, 210, 310, 410, 510) is implemented in the first feedback loop and is configured to inject a first phase shift into the amplified electrical signals. The first phase shift is configured to adjust the frequency of the amplified electrical signals to match the desired frequency band determined by the bandpass filter 608.

A second phase shifter 612, a representation of the second phase shifters (112, 212, 312, 412, 512) is implemented in the second feedback loop and is configured to inject a second phase shift into the second feedback loop. The second phase shift is configured to adjust the preset oscillation frequency to a new oscillation frequency to compensate for the phase shifts induced by the probe 624.

A second amplifier 614, having an adjustable gain coefficient $1/\alpha$, is a representation of the second amplifiers (214, 414, 514). The second amplifier 614 is implemented in the second feedback loop and is configured to adjust the gain value of the amplified electrical signals in the second feedback loop. The second amplifier 614 is configured to match the amplitude of the electrical signals in the second feedback loop to the amplitude of the electrical signals in the first feedback loop.

In one implementation, the second amplifier 614 is a voltage divider circuit. The second amplifier 614 allows for precise control of the signal gain to optimize the response of the oscillator system to environmental perturbations.

The hybrid free space acoustic oscillator system 600 further comprises a detector 616, (a representation of the detectors 316, 416, 516), implemented to compare the new oscillation frequency of the summed electrical signals from the first feedback loop with a reference signal 620. The detector 616 is configured to output a frequency shift corresponding to a difference between the new oscillation frequency and the preset oscillation frequency, thereby determining the tilt angle of the probe 624. The output 622 of the detector 616 represents the detected variation in oscillation frequency corresponding to changes in the tilt angle of the probe 624.

The hybrid free space acoustic oscillator system 600 is configured to determine the tilt angle of the probe 624 in real-time. As the probe 624 undergoes changes in orientation, the horizontal path traversed by the acoustic signals varies accordingly. The detector 616 measures the resulting frequency shift and outputs the corresponding variation at output 622.

The hybrid free space acoustic oscillator system 600 provides a precise and non-contact method for measuring the tilt angle of a probe. By dynamically adjusting the oscillation frequency in response to phase variations induced by the probe 624, the system 600 achieves highly sensitive detection of tilt angle changes. The detector 616 ensures real-time measurement of frequency shifts, enabling precise monitoring of probe orientation. The detector 616 may include a computing device configured to match the frequency difference to a database record or a lookup table stored in memory to determine the property of the sample under test.

The various configurations described through FIG. 1 to FIG. 6 depict a hybrid free space acoustic oscillator system for sensing perturbations in a free space region. The parameters of the system are analyzed herein.

A wave of a frequency $\omega$ undergoes a phase shift $\varphi$ when it traverses a medium of length L, which is mathematically expressed as:

$$\varphi = \frac{2\pi}{\lambda} \sqrt{\epsilon_r} L = \frac{\omega}{v} L \quad (1)$$

where $\epsilon_r$, and v are dielectric constant of the medium and wave speed in that medium that vary according to changes in medium characteristics, such as temperature, density, pressure, and the like. By differentiating Equation (1) while assuming the phase shift $\varphi$ remains constant, the following expression is obtained:

$$\delta\omega = \delta v \frac{\varphi}{L} = \delta v \frac{\frac{\omega}{v} L}{L} = \omega \frac{\delta v}{v} \quad (2)$$

When the slab is inserted in the free-space region of the oscillator, the system operates based on the principle that this type of oscillator transforms changes in phase, which is experienced by a wave as it traverses the free space region, into changes in oscillation frequency. following this equation. The relationship governing such transformation is given by:

$$\frac{\omega_1 L}{v_{air}} = \frac{\omega_2 (L-t)}{v_{air}} + \frac{\omega_2 t}{v_{slab}} \quad (3)$$

where $\omega_1$ represents the initial oscillation frequency when the entire free-space region of length L is filled with air, while 02 denotes the new oscillation frequency when a slab of thickness t is inserted into this region. The speed of the acoustic wave in air is $v_{air}$, whereas the speed of the acoustic wave within the slab medium is $v_{slab}$. Solving for the new oscillation frequency $\omega_2$, an equation is formulated as:

$$\omega_2 = \frac{\frac{\omega_1 L}{v_{air}}}{\left(\frac{L-t}{v_{air}} + \frac{t}{v_{slab}}\right)} \quad (4)$$

As a result, the shift in oscillation frequency is determined by:

$$\delta f = f_2 - f_1 = \frac{f_1 \left(\frac{t}{v_{air}} - \frac{t}{v_{slab}}\right)}{\left(\frac{L-t}{v_{air}} + \frac{t}{v_{slab}}\right)} \quad (5)$$

Equation (5) describes the frequency drift experienced by the oscillator due to the insertion of the slab into the free-space region. The expressed correlation renders the system to precisely determine thickness of the slab by evaluating the corresponding change in oscillation frequency.

Figure 7:
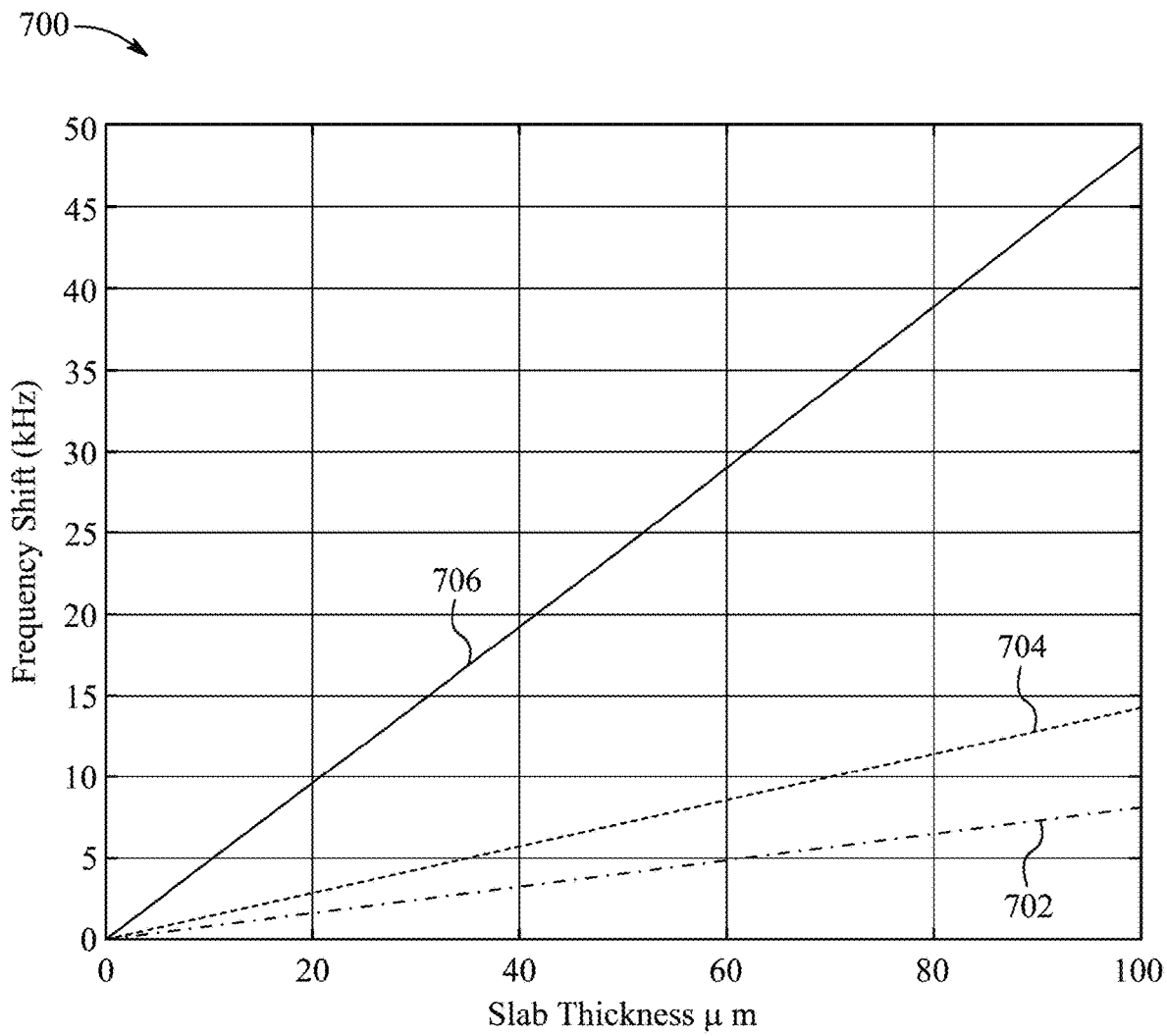
FIG. 7 illustrates a graph that represents the relationship between the frequency shift of oscillations and the slab thickness in a free-space region of a hybrid free-space acoustic oscillator system, according to certain embodiments.

FIG. 7 illustrates a graph 700 that represents the relationship between the frequency shift of oscillations and the slab thickness in a free-space region of a hybrid free-space acoustic oscillator system. The graph 700 provides a visual representation of the frequency deviation as a function of slab thickness for different values of the separation distance between an acoustic transmitter and an acoustic receiver.

The x-axis of the graph 700 represents the slab thickness in micrometers (μm), while the y-axis represents the frequency shift in kilohertz (kHz). The graph 700 includes three linear curves, each corresponding to a different free-space region length L, which is the separation distance between the acoustic transmitter and the acoustic receiver.

The curve 702 represents a free-space region length L=15 mm, the curve 704 represents a free-space region length L=10 mm, and the curve 706 represents a free-space region length L=5 mm. The frequency shift is shown to increase with slab thickness across all three curves, with the highest frequency shift occurring at the shortest free-space region length. This trend indicates that a smaller separation distance between the acoustic transmitter and the acoustic receiver results in a higher frequency shift for the same slab thickness.

The graph 700 demonstrates that the hybrid free-space acoustic oscillator system exhibits a maximum recorded sensitivity of 50 kHz per 100 μm of slab thickness, illustrating the capability of the system to measure small variations in slab thickness with high precision. This sensitivity makes the system suitable for real-time monitoring and thickness measurement applications in industrial manufacturing processes.

Figure 8:
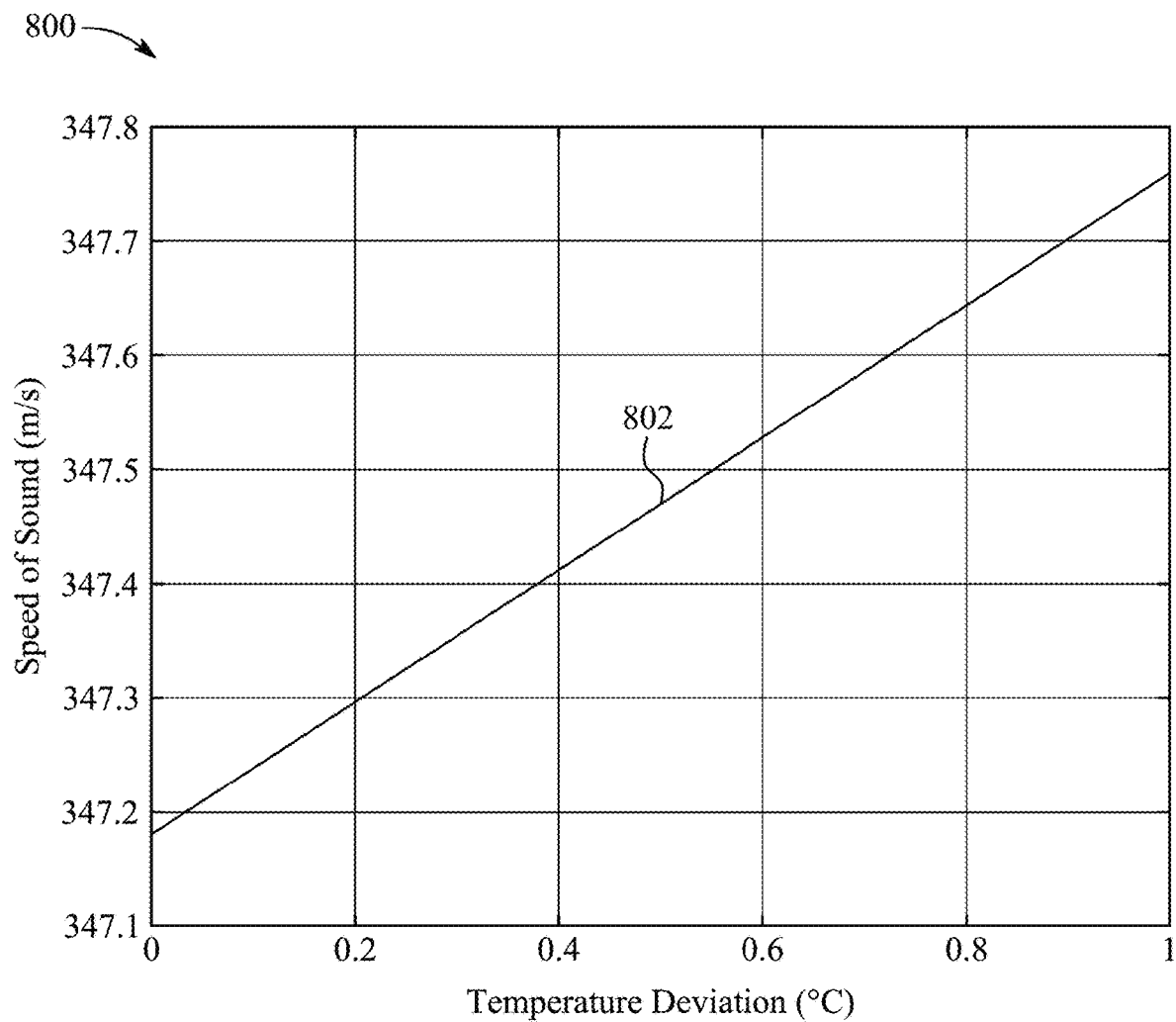
FIG. 8 illustrates a graph that represents the relationship between the speed of sound and the temperature deviation in a free-space region of a hybrid free-space acoustic oscillator system, according to certain embodiments.

FIG. 8 illustrates a graph 800 that represents the relationship between the speed of sound and the temperature deviation in a free-space region of a hybrid free-space acoustic oscillator system. The graph 800 provides a visual representation of how minor variations in temperature affect the speed of sound in the free-space region.

The x-axis of the graph 800 represents the temperature deviation in degrees Celsius (° C.), while the y-axis represents the speed of sound in meters per second (m/s). The graph 800 includes a curve 802 that illustrates the variation in the speed of sound when the temperature deviation is restricted to a range of one degree over 300 K.

The curve 802 demonstrates that the change in the speed of sound remains below 1 m/s across the given temperature deviation range. The linear trend observed in the graph 800 indicates that even minor fluctuations in temperature influence the propagation speed of the acoustic wave in the free-space region.

The data presented in the graph 800 validates the ability of the hybrid free-space acoustic oscillator system to detect temperature deviations based on changes in acoustic wave propagation. The minimal change in the speed of sound confirms the high precision of the system in applications where environmental stability is essential. The sensitivity of the system to temperature-induced phase shifts further supports its applicability in real-time temperature monitoring and ultra-precise acoustic sensing applications.

Figure 9:
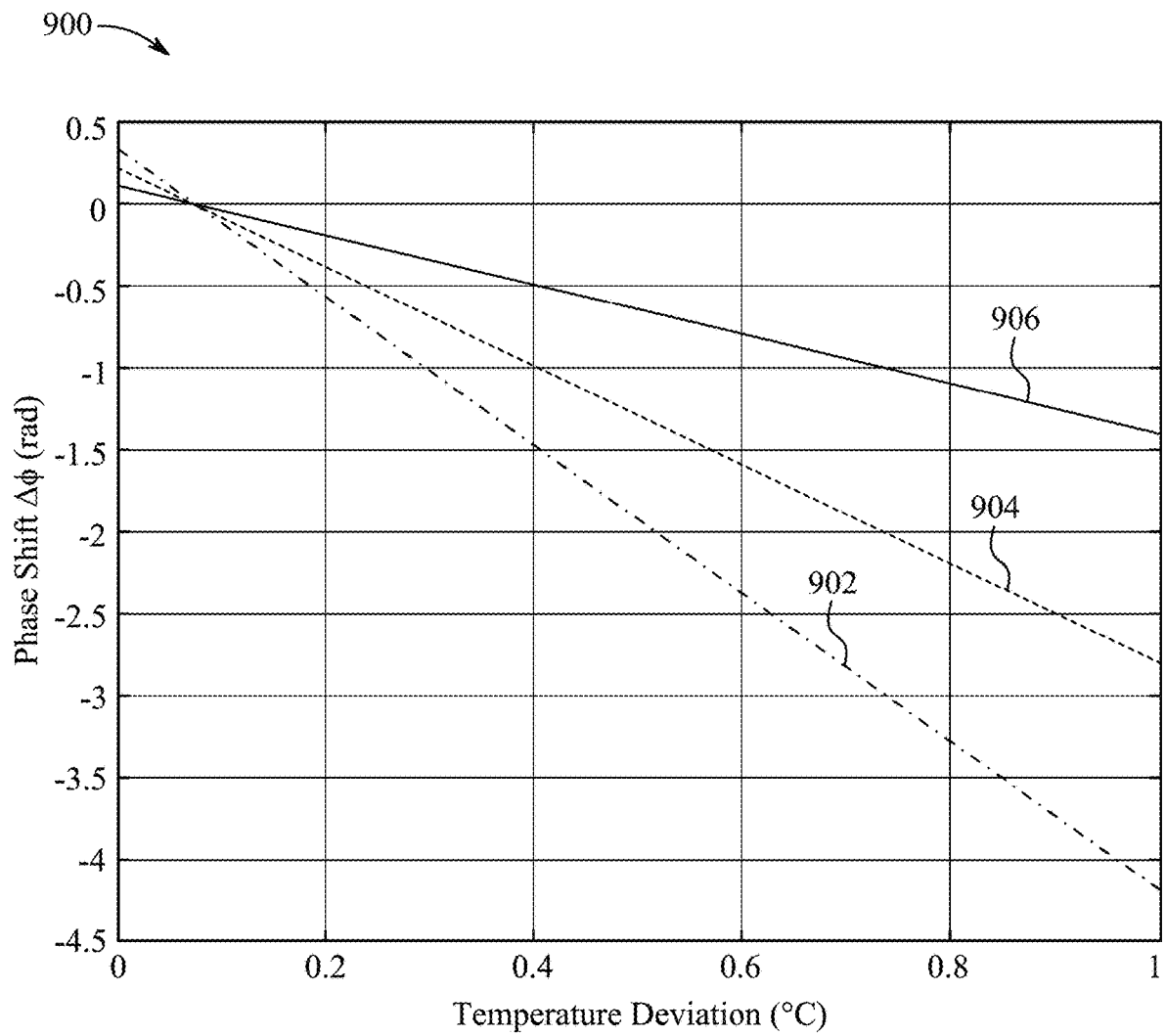
FIG. 9 illustrates a graph that represents the relationship between the phase shift encountered by an acoustic wave in the free-space region and temperature deviation of the medium in a hybrid free-space acoustic oscillator system, according to certain embodiments.

FIG. 9 illustrates a graph 900 that represents the relationship between the phase shift encountered by an acoustic wave in the free-space region and temperature deviation in a hybrid free-space acoustic oscillator system. The graph 900 provides a visual representation of how variations in temperature influence the phase shift at an initial oscillation frequency of 1 MHz for different free-space region distances.

The x-axis of the graph 900 represents the temperature deviation in degrees Celsius (° C.), while the y-axis represents the phase shift (Δφ) in radians. The graph 900 includes three curves, each corresponding to a different free-space region length L, which is the separation distance between an acoustic transmitter and an acoustic receiver.

The curve 902 represents a free-space region length of 15 cm, the curve 904 represents a free-space region length of 10 cm, and the curve 906 represents a free-space region length of 5 cm. The phase shift is shown to decrease in magnitude as the temperature deviation increases for all three curves. The highest phase shift occurs at the longest free-space region length, indicating that increasing the distance between the acoustic transmitter and the acoustic receiver results in a larger phase shift for the same temperature variation.

The graph 900 demonstrates a linear relationship between the phase shift and temperature deviation, highlighting the capability of the hybrid free-space acoustic oscillator system to detect temperature changes with high sensitivity. The linear dependence simplifies calibration, making the system advantageous for real-time temperature sensing applications.

The data presented in the graph 900 validates the sensitivity of the hybrid free-space acoustic oscillator system as a temperature sensor. The phase shift variation confirms that the system can detect minute temperature changes in the free-space region.

Figure 10:
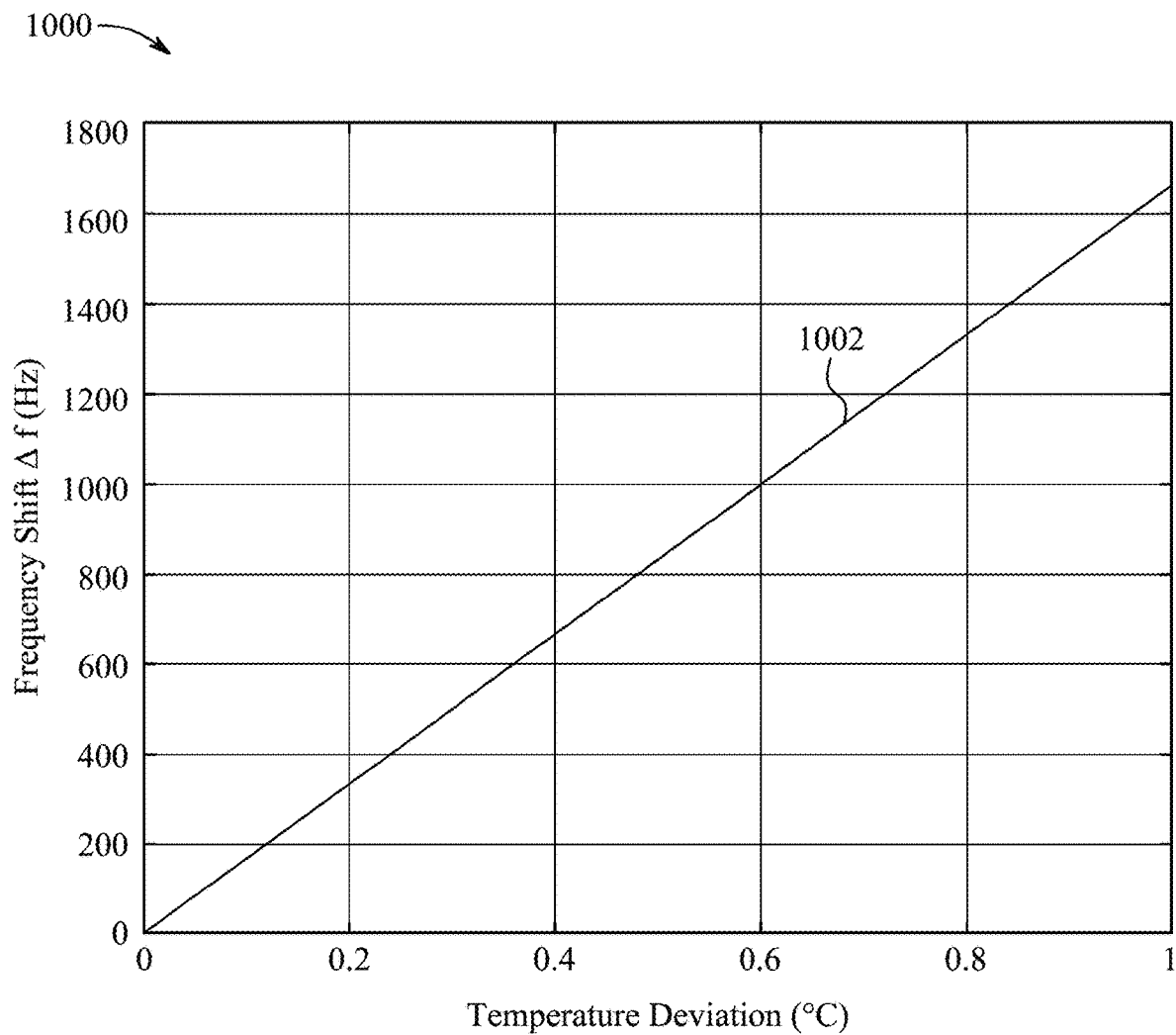
FIG. 10 illustrates a graph that represents the relationship between the oscillation frequency shift and temperature deviation in a hybrid free-space acoustic oscillator system, according to certain embodiments.

FIG. 10 illustrates a graph 1000 that represents the relationship between the oscillation frequency shift and temperature deviation in a hybrid free-space acoustic oscillator system. The graph 1000 provides a visual representation of the effect of temperature variations on the oscillation frequency of the system.

The x-axis of the graph 1000 represents the temperature deviation in degrees Celsius (° C.), while the y-axis represents the frequency shift Δf in Hertz (Hz). The graph 1000 includes a curve 1002, which depicts the oscillation frequency shift as a function of temperature variation.

The data in FIG. 10 demonstrates that the oscillation frequency of the hybrid free-space acoustic oscillator system changes by 1600 Hz for a 1° C. increase in air temperature. This indicates that even a small variation in temperature results in a measurable frequency shift, highlighting the sensitivity of the system in detecting temperature changes.

The linear relationship between the temperature deviation and oscillation frequency shift confirms the suitability of the hybrid free-space acoustic oscillator system for precise temperature sensing applications. The ability to measure frequency deviation with high accuracy ensures that the system can be implemented in environmental monitoring applications where real-time temperature detection is required.

The results presented in FIG. 10 validate the system's ability to detect minute changes in temperature, further demonstrating its feasibility for scientific, industrial, and environmental sensing applications.

Figure 11:
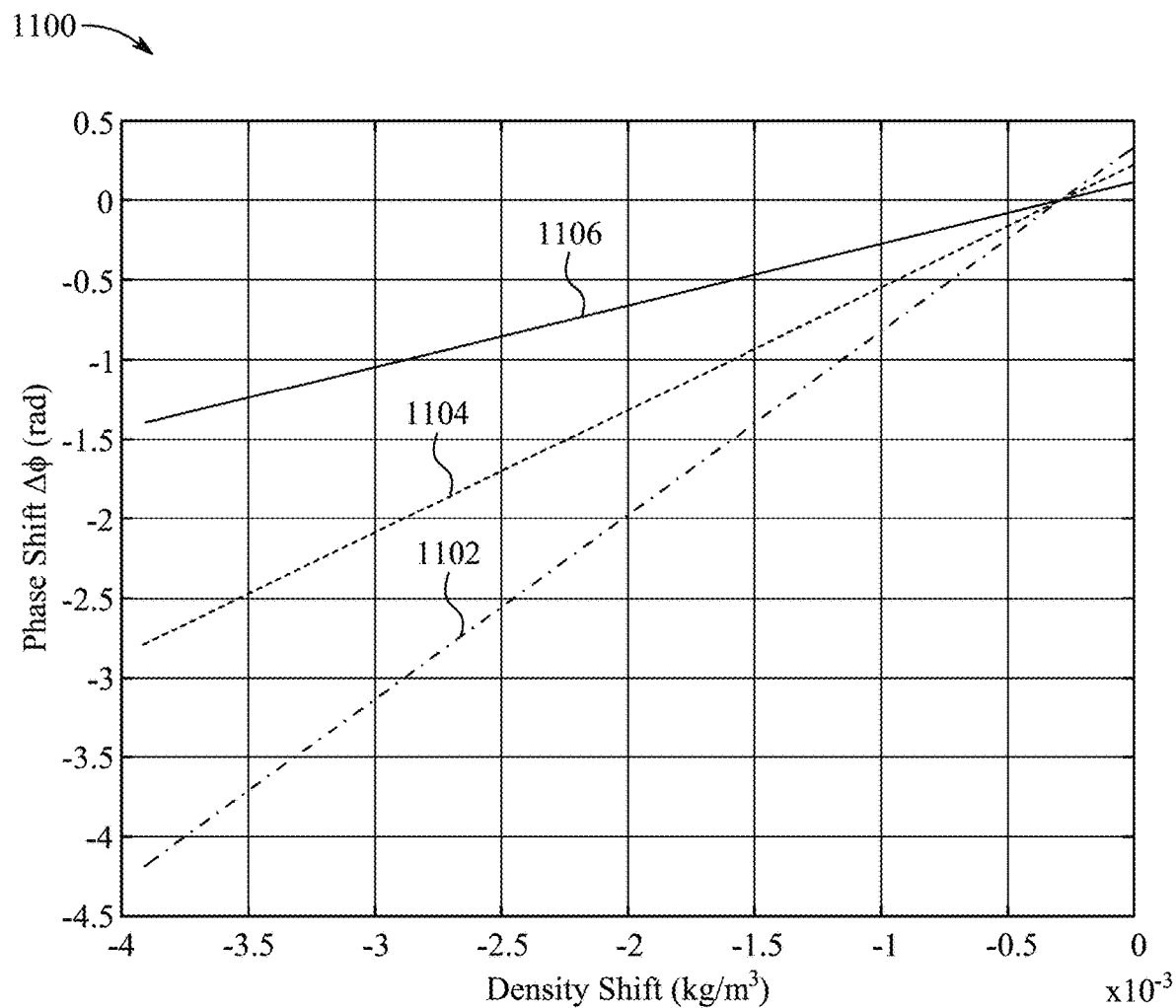
FIG. 11 illustrates a graph that represents the relationship between phase shift and density shift in a free-space region of a hybrid free-space acoustic oscillator system, according to certain embodiments.

FIG. 11 illustrates a graph 1100 that represents the relationship between phase shift and density shift in a free-space region of a hybrid free-space acoustic oscillator system. The graph 1100 provides a visual representation of how variations in gas density affect the phase of an acoustic wave propagating in the free-space region.

The x-axis of the graph 1100 represents the density shift in kilograms per cubic meter (kg/m$^3$), while the y-axis represents the phase shift Δφ in radians (rad). The graph 1100 includes three curves, each corresponding to a different free-space region length L, which represents the separation distance between an acoustic transmitter and an acoustic receiver.

The curve 1102 represents a free-space region length L=0.15 m, the curve 1104 represents a free-space region length L=0.1 m, and the curve 1106 represents a free-space region length L=0.05 m. The phase shift increases in magnitude as the gas density shift increases, with the largest phase shift occurring for the longest free-space region length. This trend demonstrates that a greater separation distance between the acoustic transmitter and the acoustic receiver results in a higher phase shift for the same density variation.

The graph 1100 confirms that the hybrid free-space acoustic oscillator system exhibits a measurable phase shift in response to small variations in gas density. The system is sensitive to density changes within a limited range, which validates its feasibility for environmental sensing applications where gas density measurements are required.

The linear dependence between the phase shift and the gas density shift in FIG. 11 indicates that the hybrid free-space acoustic oscillator system can be implemented as an accurate and reliable environmental sensor for gas density measurements. The ability to detect such small variations in gas density ensures that the system is suitable for real-time environmental monitoring and scientific research applications.

Figure 12:
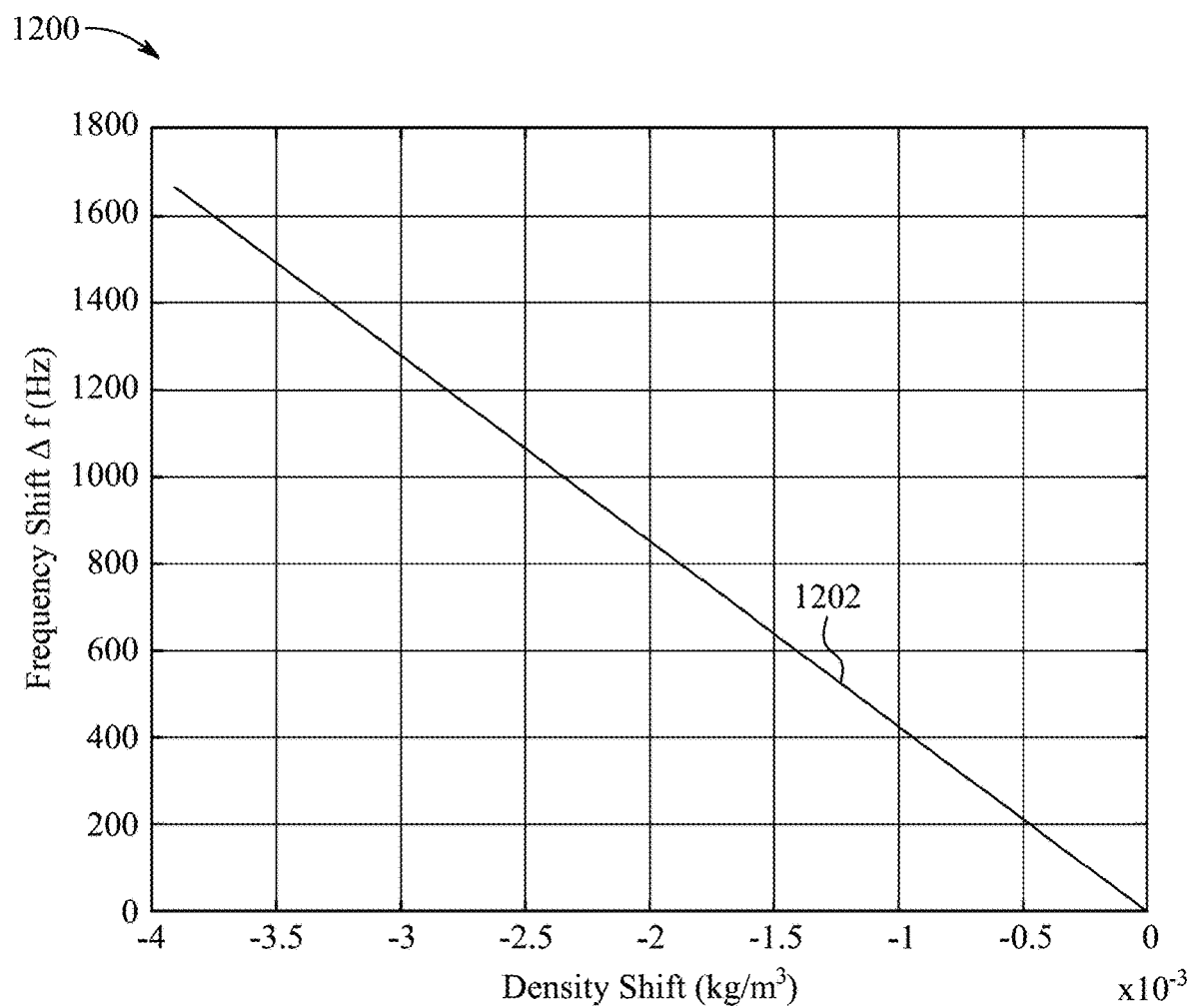
FIG. 12 illustrates a graph that represents the relationship between the oscillation frequency shift and the density shift of a gas medium in the free-space region of a hybrid free-space acoustic oscillator system, according to certain embodiments.

FIG. 12 illustrates a graph 1200 that represents the relationship between the oscillation frequency shift and the density shift of a gas medium in the free-space region of a hybrid free-space acoustic oscillator system. The graph 1200 provides a visual representation of the frequency deviation as a function of gas density variations that occur within the free-space region included between an acoustic transmitter and an acoustic receiver.

The x-axis of the graph 1200 represents the density shift in kilograms per cubic meter (kg/m$^3$), while the y-axis represents the frequency shift in hertz (Hz). The graph 1200 includes a single curve 1202, which characterizes the oscillation frequency deviation with respect to variations in the density of the gas medium.

The curve 1202 shows a linear trend with a slope of −400 Hz per (g/m$^3$), indicating that changes in gas density results in inverse proportional variations in the oscillation frequency. The oscillation frequency is shown to decrease as the density of the gas medium decreases. This behavior is consistent with the phase shift variations recorded in FIG. 11, which demonstrates the corresponding phase deviations induced by gas density fluctuations.

The graph 1200 further illustrates that the hybrid free-space acoustic oscillator system is capable of compensating for phase changes resulting from variations in gas density by inducing frequency shifts to maintain stable oscillations. This capability makes the system suitable for real-time environmental monitoring applications, including gas density sensing in industrial, laboratory, and atmospheric conditions.

Figure 13:
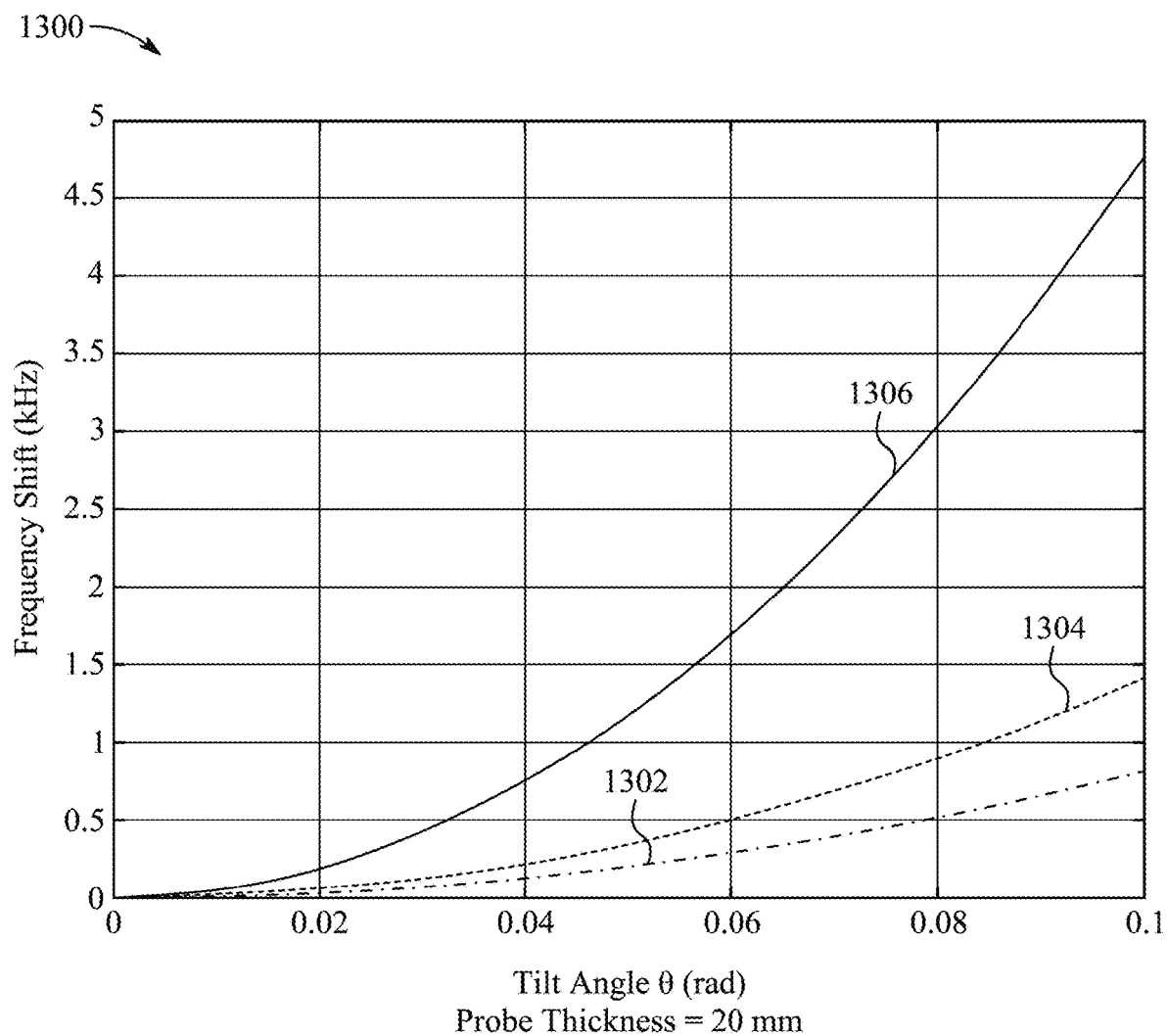
FIG. 13 illustrates a graph that represents the relationship between the oscillation frequency shift and the tilt angle of a probe slab within the free-space region of a hybrid free-space acoustic oscillator system, according to certain embodiments.

FIG. 13 illustrates a graph 1300 that represents the relationship between the oscillation frequency shift and the tilt angle of a probe slab within the free-space region of a hybrid free-space acoustic oscillator system. The graph 1300 provides a visual representation of the frequency deviation as a function of variations in the probe tilt angle for different values of the separation distance between an acoustic transmitter and an acoustic receiver.

The x-axis of the graph 1300 represents the tilt angle (θ) in radians, while the y-axis represents the frequency shift in kilohertz (kHz). The graph 1300 includes three curves, each corresponding to a different free-space region length L, which is the separation distance between the acoustic transmitter and the acoustic receiver.

The curve 1302 represents a free-space region length L=150 mm, the curve 1304 represents a free-space region length L=100 mm, and the curve 1306 represents a free-space region length L=50 mm. The oscillation frequency shift is shown to exhibit a nonlinear behavior with respect to the tilt angle across all three curves, with the highest frequency shift occurring at the shortest free-space region length. This trend indicates that a smaller separation distance between the acoustic transmitter and the acoustic receiver results in a greater oscillation frequency shift for the same tilt angle.

The graph 1300 demonstrates that the hybrid free-space acoustic oscillator system exhibits a maximum frequency shift of 5 kHz for a tilt angle of 0.1 rad. The probe slab has a thickness of 2 mm, and the acoustic wave propagates within the probe slab medium at a speed of 5000 m/s, whereas the acoustic wave speed in the free-space region of the oscillator is 340 m/s. The oscillation frequency of the acoustic oscillator is initially adjusted to 1 MHz.

The graph 1300 further illustrates that variations in the tilt angle of the probe slab result in corresponding frequency deviations, thereby enabling the system to be used for precise tilt angle sensing applications. The nonlinear relationship between the frequency shift and the tilt angle provides enhanced sensitivity for detecting small angular deviations, making the system suitable for real-time monitoring of mechanical displacements, structural deformations, and tilt-based measurement applications.

Figure 14:
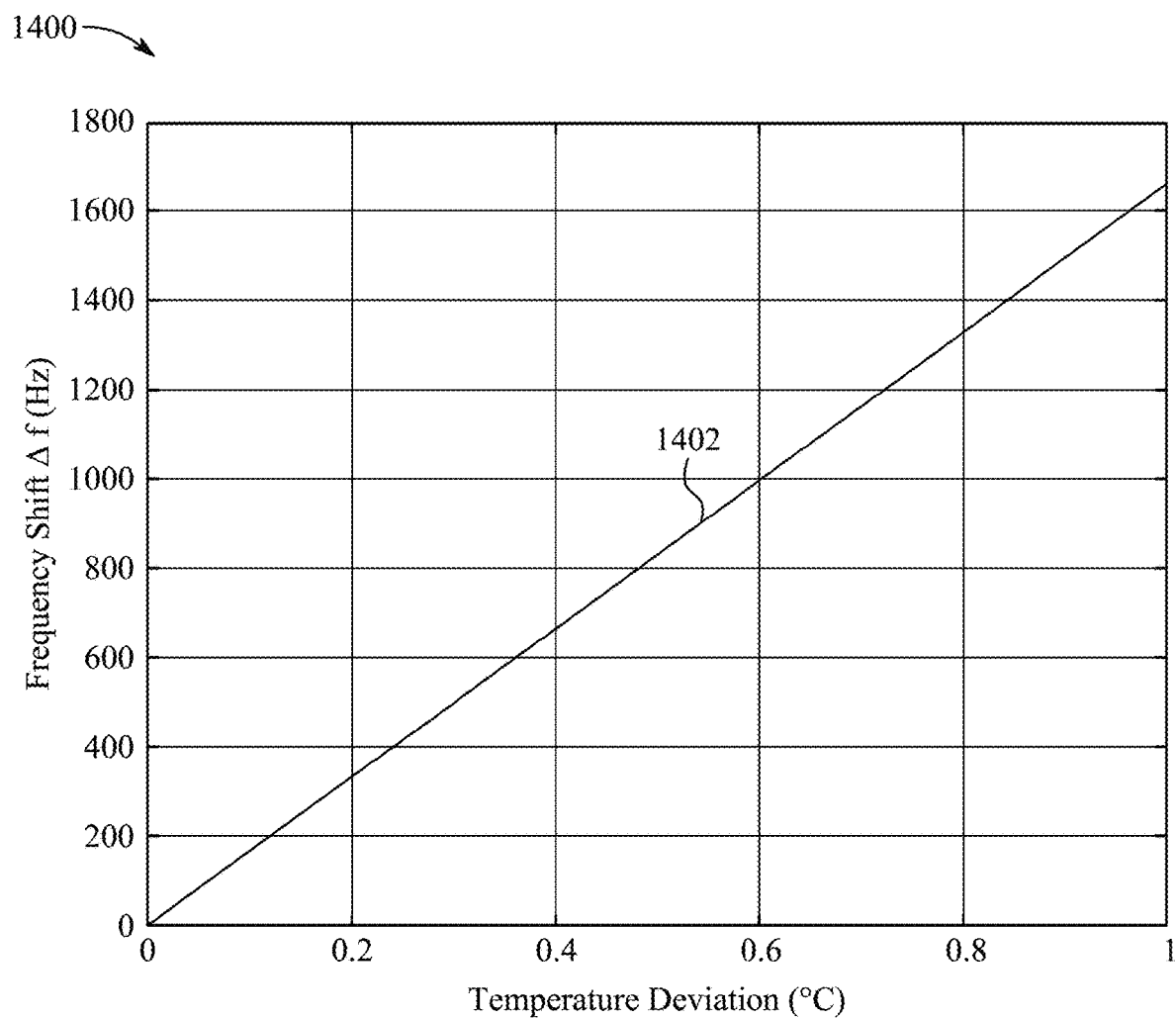
FIG. 14 illustrates a graph that represents the relationship between the oscillation frequency shift and the temperature deviation of the medium spanning the free-space region of a hybrid free-space acoustic oscillator system, according to certain embodiments.

FIG. 14 illustrates a graph 1400 that represents the relationship between the oscillation frequency shift and the temperature deviation of the medium spanning the free-space region of a hybrid free-space acoustic oscillator system. The graph 1400 provides a visual representation of the frequency shift as a function of temperature variation within the separating region between an acoustic transmitter and an acoustic receiver.

The x-axis of the graph 1400 represents the temperature deviation in degrees Celsius (° C.), while the y-axis represents the frequency shift in hertz (Hz). The graph 1400 includes a single curve 1402, which demonstrates the linear dependence of oscillation frequency variation on temperature deviation.

The curve 1402 exhibits a linear relationship with a slope of 1.6 kHz/° C., indicating that an increase in temperature results in a proportional shift in oscillation frequency. This characteristic reflects the system's capability to provide high sensitivity in temperature measurement applications.

The graph 1400 further demonstrates that although the phase changes recorded in FIG. 9 due to temperature variation are relatively small, these phase variations induce significant changes in oscillation frequency. This frequency adjustment enables the system to automatically compensate for phase variations, ensuring accurate sensing and maintaining frequency stability.

The linear response of the oscillation frequency shift to temperature variation, as shown in graph 1400, highlights the system's effectiveness as a temperature sensor. This feature makes the hybrid free-space acoustic oscillator system suitable for real-time environmental monitoring and precision temperature measurement applications.

Figure 15:
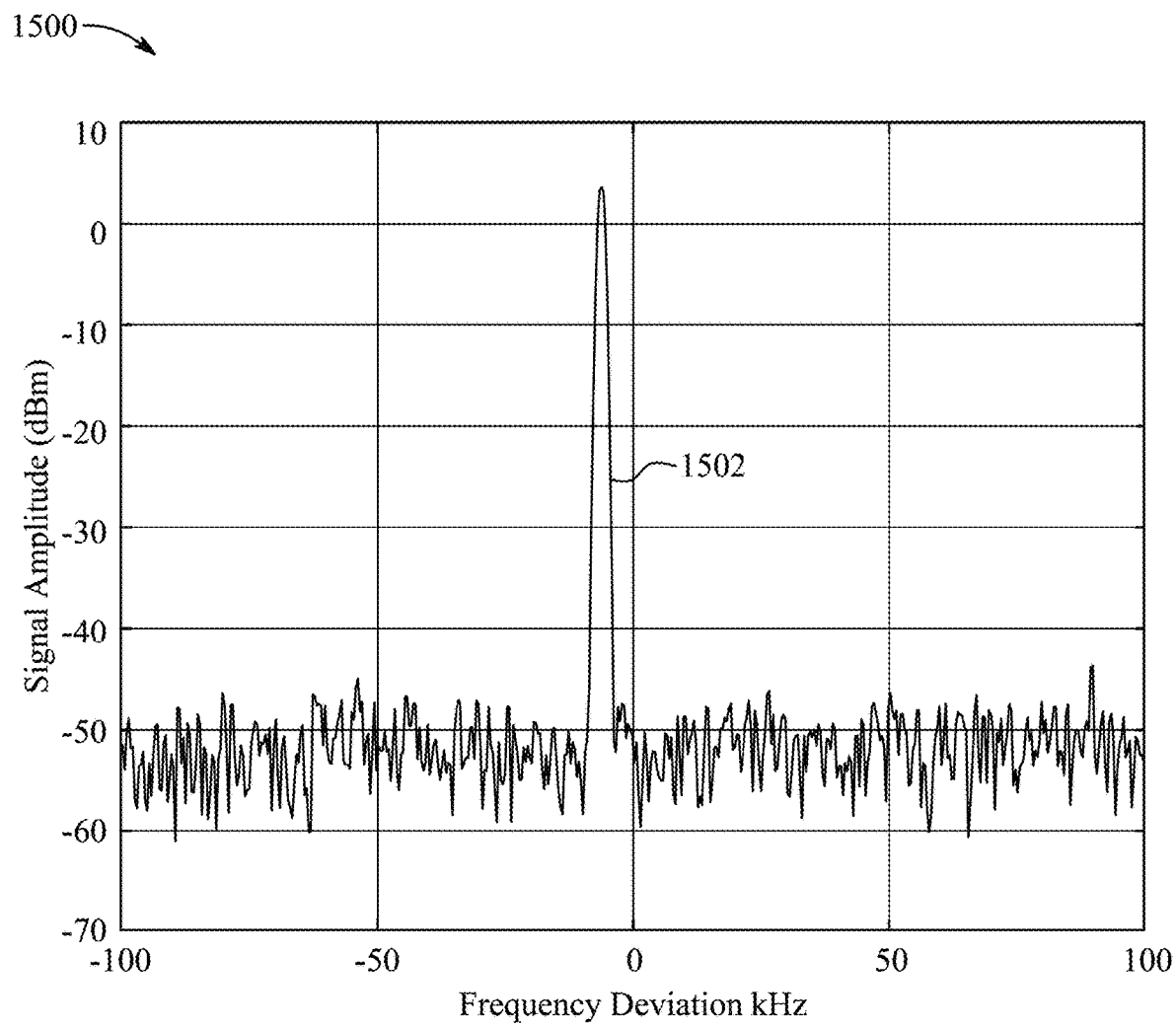
FIG. 15 is a graphical representation depicting a deviation in oscillation frequency in response to a temperature decrease in the air medium, having a reduction in temperature by 3° C. results in a 4.8 kHz shift in oscillation frequency, according to certain embodiments.

FIG. 15 illustrates a graph 1500 that represents the measured deviation in signal amplitude of the oscillation frequency in response to temperature variations in the air medium within the free-space region of the free-space acoustic oscillator. Specifically, a reduction in temperature by 3° C. results in a 4.8 kHz shift in oscillation frequency. The free-space region length is set to 15 mm, and the initial RF frequency is adjusted to 1 MHz. The recorded frequency shift aligns with the simulation results depicted in FIG. 10. The measurement is performed using a detector with a resolution bandwidth (RBW) of 1 kHz and a video bandwidth (VBW) of 1 kHz.

The graph 1500 provides a visual representation of the signal amplitude as a function of frequency deviation, demonstrating the impact of temperature variation on oscillation frequency.

The x-axis of the graph 1500 represents the frequency deviation in kilohertz (kHz), while the y-axis represents the signal amplitude in decibels-milliwatts (dBm). The graph 1500 includes a spectral peak 1502, which indicates the recorded frequency shift in response to a temperature decrease in the laboratory environment.

The graph 1500 demonstrates that a reduction in air temperature by 3° C. results in an oscillation frequency deviation of 4.8 kHz. The free-space region length of the free-space acoustic oscillator system is adjusted to 15 mm, and the initial radio frequency (RF) oscillation frequency is set to 1 MHz. The recorded frequency shift aligns with the simulated results shown in FIG. 10, verifying the accuracy of the experimental measurements.

The measurement setup for the frequency spectrum analysis includes a detector configured with a resolution bandwidth (RBW) of 1 kHz and a video bandwidth (VBW) of 1 kHz. The spectral response of the oscillator system confirms the sensitivity of the proposed system for temperature variation detection, making it a viable solution for precision environmental sensing applications.

Figure 16:
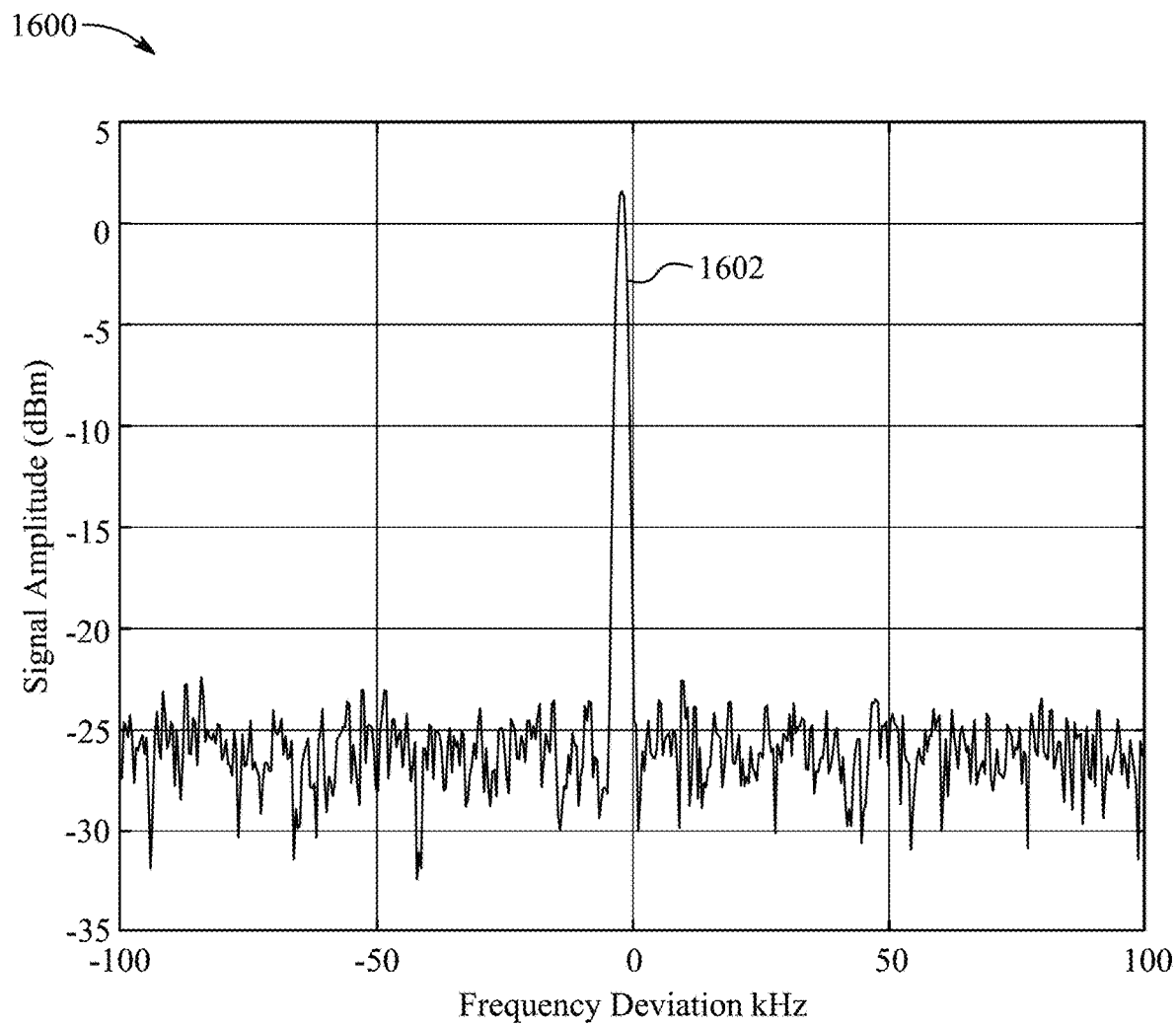
FIG. 16 is a graphical representation depicting a deviation in oscillation frequency due to the tilting of a probe having a tilt angle of 4° inducing a frequency shift of 2 kHz, according to certain embodiments.

FIG. 16 depicts the deviation in the amplitude of the oscillation frequency due to the tilting of a glass plate with a thickness of 20 mm within the free-space acoustic oscillator. A tilt angle of 4° induces a frequency shift of 2 kHz. The free-space region length is configured to 50 mm, and the initial RF frequency is set to 1 MHz. These experimental results corroborate the simulation data presented in FIG. 13. The detector parameters include a resolution bandwidth (RBW) of 1 kHz and a video bandwidth (VBW) of 1 kHz.

The graph 1600 provides a visual representation of the signal amplitude as a function of frequency deviation, demonstrating the effect of probe tilt on the oscillation frequency.

The x-axis of the graph 1600 represents the frequency deviation in kilohertz (kHz), while the y-axis represents the signal amplitude in decibels-milliwatts (dBm). The graph 1600 includes a spectral peak 1602, which indicates the recorded frequency shift in response to a tilt of a glass plate in the free-space region.

The graph 1600 demonstrates that a tilt angle of 4° for a glass plate with a thickness of 20 mm results in an oscillation frequency deviation of 2 kHz. The free-space region length of the free-space acoustic oscillator system is adjusted to 50 mm, and the initial radio frequency (RF) oscillation frequency is set to 1 MHz. The recorded frequency shift aligns with the simulated results shown in FIG. 13, confirming the accuracy of the experimental measurements.

The measurement setup for the frequency spectrum analysis includes a detector configured with a resolution bandwidth (RBW) of 1 kHz and a video bandwidth (VBW) of 1 kHz. The spectral response of the oscillator system validates the system's sensitivity to probe tilt, making it suitable for precision measurement applications in alignment sensing and structural monitoring.

Various embodiments of a hybrid free space acoustic oscillator system for sensing perturbations in a free space region are described through FIG. 1 to FIG. 16. In one exemplary embodiment, a hybrid free space acoustic oscillator system for sensing perturbations in a free space region is disclosed. The system includes an acoustic transmitter configured to transmit a series of signals at a preset oscillation frequency into the free space region and a sample under test located in the free space region. The series of signals are phase shifted from the preset oscillation frequency by perturbations of the sample under test, an acoustic receiver configured to receive the phase shifted series of signals and convert the phase shifted series of signals to electrical signals. The system further includes first feedback loop and a second feedback loop connected between the acoustic receiver and the acoustic transmitter and a first amplifier located in the first feedback loop. The first amplifier is configured to receive the electrical signals and amplify the electrical signals by a gain value A, a bandpass filter connected to the first amplifier, where the bandpass filter is configured to filter the amplified the electrical signals of the first feedback loop to a desired frequency band.

The system further includes a first phase shifter connected to the bandpass filter. The first phase shifter is configured to inject a first phase shift into the amplified electrical signals of the first feedback loop. The first phase shift is configured to adjust a frequency of the amplified electric signals to the desired frequency band. The system further includes a second phase shifter located in the second feedback loop. The second phase shifter is configured inject a second phase shift into the second feedback loop. The second phase shift is configured to adjust the preset oscillation frequency to a new oscillation frequency to compensate for the phase shifts in the preset oscillation frequency induced by the sample under test.

The system further includes a second amplifier connected to the second phase shifter. The second amplifier is configured to amplify the electrical signals of the second feedback loop phase shifted by the second phase shifter. The system further includes a detector connected to the first feedback loop and the second feedback loop. The detector is configured to measure a difference between the preset oscillation frequency and the new oscillation frequency and determine a property of the sample under test.

In some embodiments, the acoustic receiver is configured to transmit a first half of the electrical signals into the first feedback loop and transmit a second half of the electrical signals into the second feedback loop.

In some embodiments, the second amplifier has a fixed gain value K, and the detector is a detector configured to generate a frequency spectrum of the electrical signals of the first half of the electrical signals and the second half of the electrical signals of the second feedback path, determine the difference between the preset oscillation frequency and the new oscillation frequency and determine the property of the sample under test based on the difference.

In some embodiments, the sample under test is a gas, the property is a density of the gas, the perturbations in the free space path are due to changes in the density of the gas and the detector is configured to detect the shift in frequency to the new oscillation frequency resulting from the changes in the density of the gas.

In some embodiments, the sample under test is air, the property is a temperature of the air, the perturbations in the free space path are due to changes in the temperature of the air and the detector is configured to detect the shift in frequency to the new oscillation frequency resulting from the changes in the temperature of the air.

In some embodiments, the second amplifier has a fixed gain value K, and the detector is a mixer configured to compare the new oscillation frequency of the electrical signals of the first half of the electrical signals and the second half of the electrical signals of the second feedback path to a reference frequency.

In some embodiments, the sample under test is a gas, the property is a density of the gas, the perturbations in the free space path are due to changes in the density of the gas and the mixer is configured to output a frequency shift between the reference frequency and the new oscillation frequency resulting from the changes in the density of the gas.

In some embodiments, the sample under test is air, the property is a temperature of the air, the perturbations in the free space path are due to changes in the temperature of the air and the mixer is configured to output a frequency shift between the reference frequency and the new oscillation frequency resulting from the changes in the temperature of the air.

In some embodiments, a summing circuit is connected to the acoustic receiver, the first feedback loop and the second feedback loop, wherein the summing circuit is configured to receive the electrical signals from the acoustic receiver and sum the electrical signals from the acoustic receiver with the amplified, second phase shifted electrical signals from the second feedback loop having the new oscillation frequency and inject the sum of the electric signals into the first feedback loop.

In some embodiments, the second amplifier has an adjustable gain value 1/a, wherein the gain value 1/a is configured to be adjusted to match the amplitude of the electrical signals in the second feedback loop to an amplitude of the electrical signals in the first feedback loop.

In some embodiments, the detector is connected to the first feedback loop, wherein the detector is configured to generate a spectrum of the summed electrical signals, determine the difference between the preset oscillation frequency and the new oscillation frequency and determine the property of the sample under test based on the difference.

In some embodiments, the sample under test is a gas, the property is a density of the gas, the perturbations in the free space path are due to changes in the density of the gas and the detector is configured to detect the shift in frequency to the new oscillation frequency resulting from the changes in the density of the gas.

In some embodiments, the sample under test is air, the property is a temperature of the air, the perturbations in the free space path are due to changes in the temperature of the air and the detector is configured to detect the shift in frequency to the new oscillation frequency resulting from the changes in the temperature of the air.

In some embodiments, the detector is a mixer connected to the first feedback loop, wherein the mixer is configured to compare the new oscillation frequency of the summed electrical signals to a reference frequency, determine the difference between the reference frequency and the new oscillation frequency to determine a property of the sample under test based on the difference.

In some embodiments, the sample under test is a gas, the property is a density of the gas, the perturbations in the free space path are due to changes in the density of the gas and the mixer is configured to output a frequency shift between the reference frequency and the new oscillation frequency resulting from the changes in the density of the gas.

In some embodiments, the sample under test is air, the property is a temperature of the air, the perturbations in the free space path are due to changes in the temperature of the air and the mixer is configured to output a frequency shift between the reference frequency and the new oscillation frequency resulting from the changes in the temperature of the air.

In some embodiments, the sample under test is a slab located in the free space path, the property is a thickness of the slab, the perturbations in the free space path are due to changes in the thickness of the slab and the mixer is configured to output a frequency shift between the reference frequency and the new oscillation frequency resulting from the changes in the thickness of the slab.

In some embodiments, the sample under test is a slab located in the free space path, wherein the slab is oriented at a varying tilt angle to an axis of the free space path, the property is the tilt angle of the slab and the mixer is configured to output a frequency shift between the reference frequency and the new oscillation frequency resulting from changes in the tilt angle of the slab.

In another exemplary embodiment, a method includes for sensing perturbations in a free space region of a hybrid free space acoustic oscillator system. The method includes transmitting, with an acoustic transmitter, a series of signals at a preset oscillation frequency into the free space region, phase shifting, by a sample under test located in the free space region, the series of signals from the preset oscillation frequency by perturbations of the sample under test, receiving, by an acoustic receiver, the phase shifted series of signals, and convert, by the acoustic receiver, the phase shifted series of signals to electrical signals. The method includes connecting a first feedback loop and a second feedback loop between the acoustic receiver and the acoustic transmitter, amplifying, by a first amplifier located in the first feedback loop, the electrical signals by a gain value A, filtering, with a bandpass filter connected to the first amplifier, the amplified the electrical signals of the first feedback loop to a desired frequency band, and injecting, by a first phase shifter connected to the bandpass filter, a first phase shift into the amplified electrical signals of the first feedback loop to adjust a frequency of the amplified electric signals to the desired frequency band.

The method further includes injecting, by a second phase shifter located in the second feedback loop, a second phase shift into the second feedback loop to adjust the preset oscillation frequency to a new oscillation frequency to compensate for the phase shifts in the preset oscillation frequency induced by the sample under test, amplifying, by a second amplifier connected to the second phase shifter, the electrical signals of the second feedback loop phase shifted by the second phase shifter, and measuring, by a detector connected to the first feedback loop and the second feedback loop, a difference between the preset oscillation frequency and the new oscillation frequency to determine a property of the sample under test, wherein the detector is one of a detector configured to generate a spectrum of the electrical signals and a mixer configured to compare the new oscillation frequency to a reference signal.

In some embodiments, the method further includes detecting, when the sample under test is a gas, the shift from the preset oscillation frequency to the new oscillation frequency resulting from changes in the density of the gas, detecting, when the sample under test is air, the shift from the preset oscillation frequency to the new oscillation frequency resulting from changes in the temperature of the air, detecting, when the sample is a slab placed in the free space path, a frequency shift between the reference frequency and the new oscillation frequency resulting from the changes in the thickness of the slab and detecting, when the sample is a slab oriented at a varying tilt angle to an axis of the free space path, a frequency shift between the reference frequency and the new oscillation frequency resulting from changes in the tilt angle of the slab.

Figure 17:
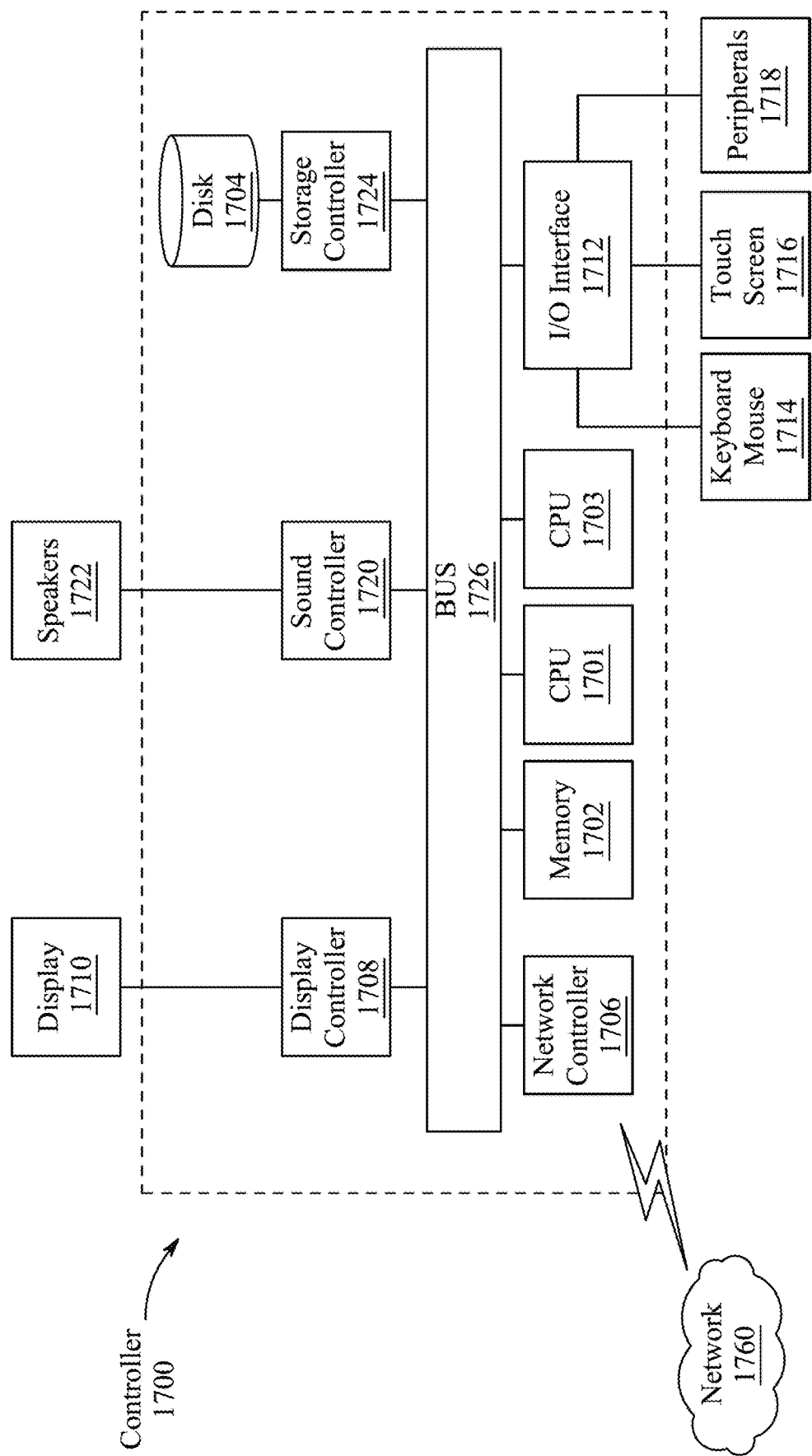
FIG. 17 is an illustration of a non-limiting example of details of computing hardware used in the computing system, according to certain embodiments.

Next, further details of the hardware description of the computing environment according to exemplary embodiments is described with reference to FIG. 17. In FIG. 17, a controller 1700 is described is representative of the detector of FIG. 1A-6, in which the computing device includes a CPU 1701 which performs the processes described above/below. The process data and instructions may be stored in memory 1702. These processes and instructions may also be stored on a storage medium disk 1704 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1701, 1703 and an operating system such as Microsoft Windows 17, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 1701 or CPU 1703 may be a Xenon or Core processor from Intel of America or an Opteron processor from AMD of America, or may be other processor types that would be recognized by one of ordinary skill in the art. Alternatively, the CPU 1701, 1703 may be implemented on an FPGA, ASIC, PLD or using discrete logic circuits, as one of ordinary skill in the art would recognize. Further, CPU 1701, 1703 may be implemented as multiple processors cooperatively working in parallel to perform the instructions of the inventive processes described above.

The computing device in FIG. 17 also includes a network controller 1706, such as an Intel Ethernet PRO network interface card from Intel Corporation of America, for interfacing with network 1760. As can be appreciated, the network 1760 can be a public network, such as the Internet, or a private network such as an LAN or WAN network, or any combination thereof and can also include PSTN or ISDN sub-networks. The network 1760 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 1708, such as a NVIDIA GeForce GTX or Quadro graphics adaptor from NVIDIA Corporation of America for interfacing with display 1710, such as a Hewlett Packard HPL2445w LCD monitor. A general purpose I/O interface 1712 interfaces with a keyboard and/or mouse 1714 as well as a touch screen panel 1716 on or separate from display 1710. General purpose I/O interface also connects to a variety of peripherals 1718 including printers and scanners, such as an OfficeJet or DeskJet from Hewlett Packard.

A sound controller 1720 is also provided in the computing device such as Sound Blaster X-Fi Titanium from Creative, to interface with speakers/microphone 1722 thereby providing sounds and/or music.

The general purpose storage controller 1724 connects the storage medium disk 1704 with communication bus 1726, which may be an ISA, EISA, VESA, PCI, or similar, for interconnecting all of the components of the computing device. A description of the general features and functionality of the display 1710, keyboard and/or mouse 1714, as well as the display controller 1708, storage controller 1724, network controller 1706, sound controller 1720, and general purpose I/O interface 1712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 18.

Figure 18:
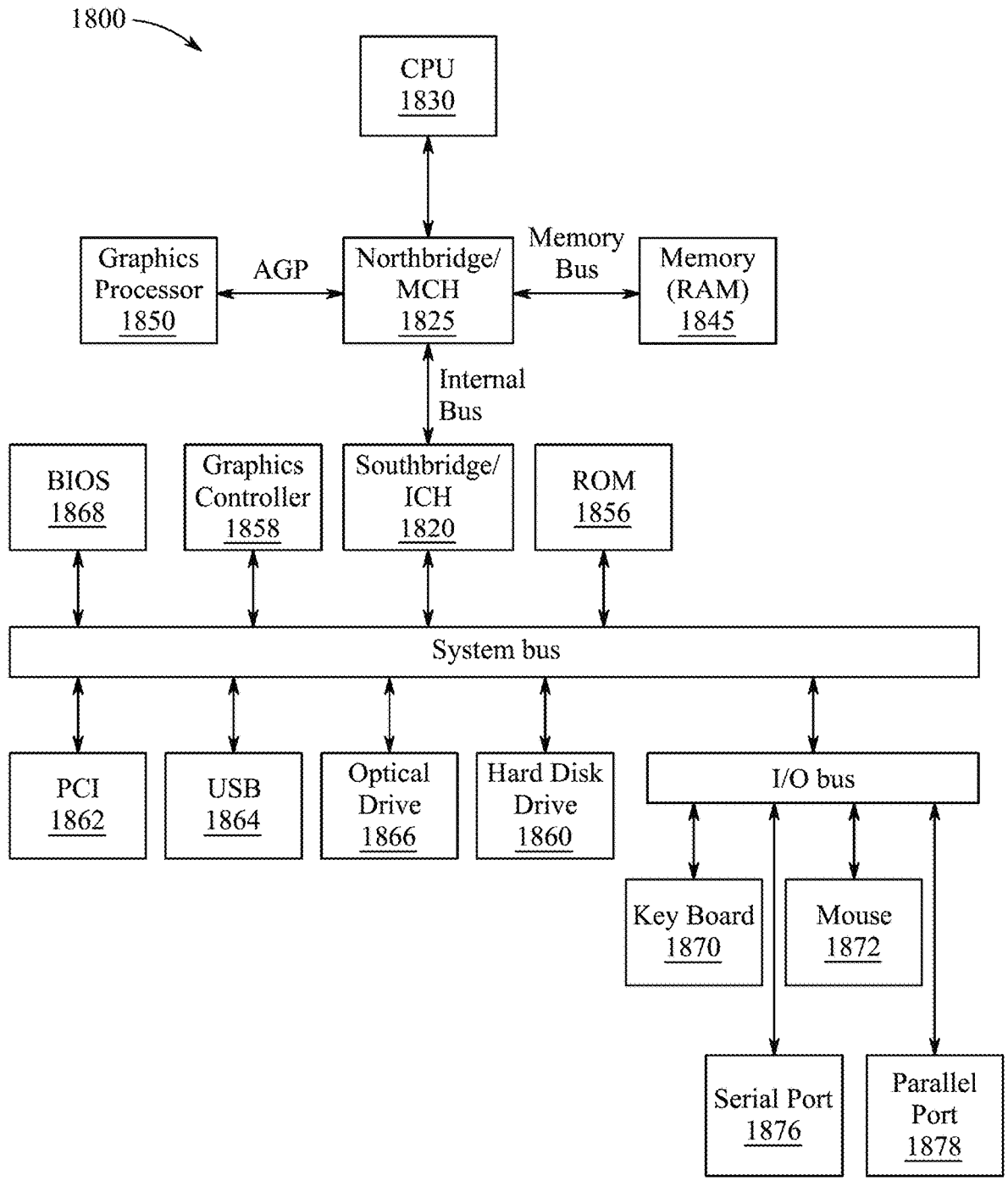
FIG. 18 is an exemplary schematic diagram of a data processing system used within the computing system, according to certain embodiments.
Figure 19:
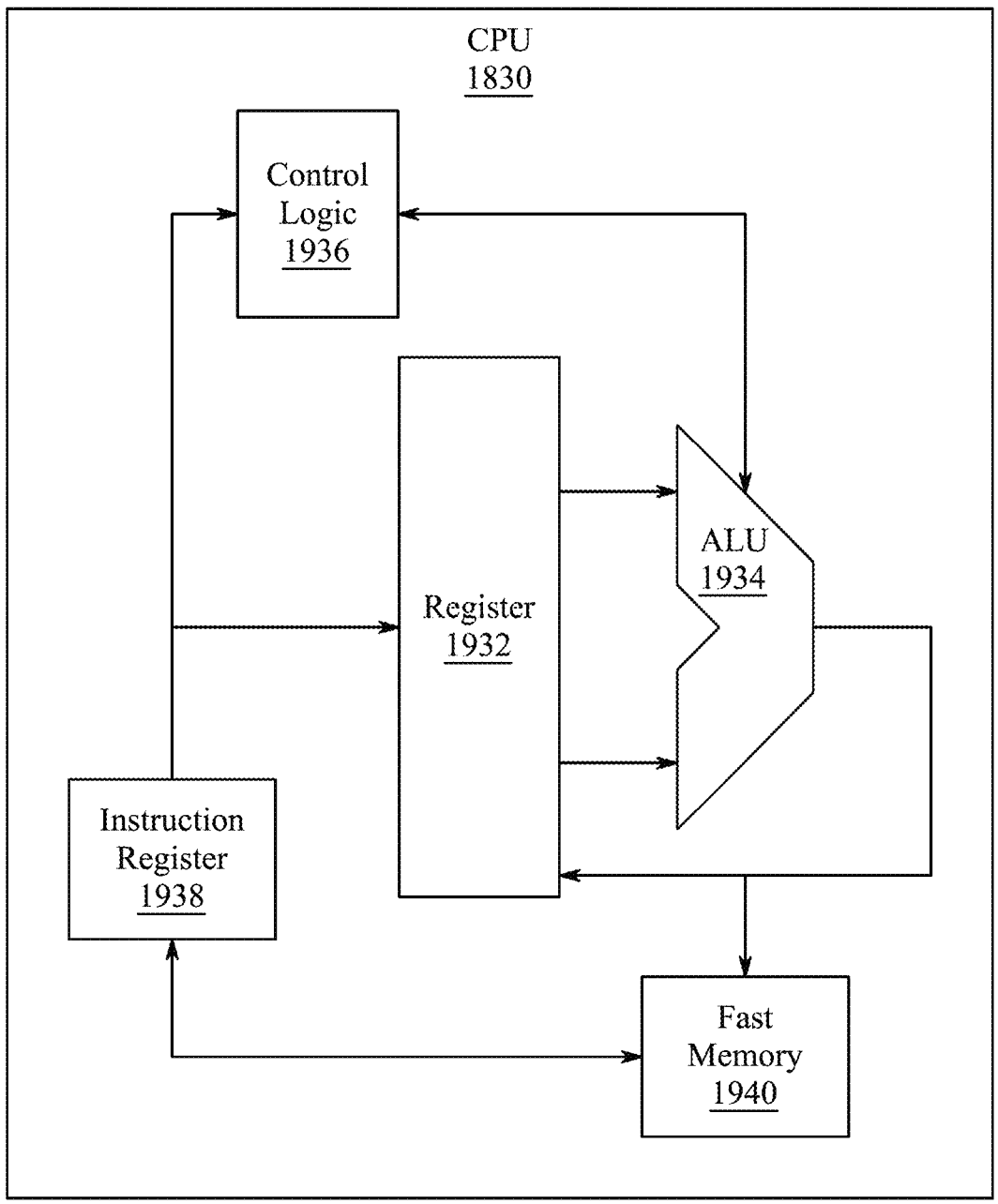
FIG. 19 is an exemplary schematic diagram of a processor used with the computing system, according to certain embodiments.

FIG. 18 shows a schematic diagram of a data processing system, according to certain embodiments, for performing the functions of the exemplary embodiments. The data processing system is an example of a computer in which code or instructions implementing the processes of the illustrative embodiments may be located.

In FIG. 18, data processing system 1800 employs a hub architecture including a north bridge and memory controller hub (NB/MCH) 1825 and a south bridge and input/output (I/O) controller hub (SB/ICH) 1820. The central processing unit (CPU) 1830 is connected to NB/MCH 1825. The NB/MCH 1825 also connects to the memory 1845 via a memory bus, and connects to the graphics processor 1850 via an accelerated graphics port (AGP). The NB/MCH 1825 also connects to the SB/ICH 1820 via an internal bus (e.g., a unified media interface or a direct media interface). The CPU Processing unit 1830 may contain one or more processors and even may be implemented using one or more heterogeneous processor systems.

For example, FIG. 9 shows one implementation of CPU 1830. In one implementation, the instruction register 1938 retrieves instructions from the fast memory 1940. At least part of these instructions is fetched from the instruction register 1938 by the control logic 1936 and interpreted according to the instruction set architecture of the CPU 1830. Part of the instructions can also be directed to the register 1932. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1934 that loads values from the register 1932 and performs logical and mathematical operations on the loaded values according to the instructions. The results from these operations can be feedback into the register and/or stored in the fast memory 1940. According to certain implementations, the instruction set architecture of the CPU 1830 can use a reduced instruction set architecture, a complex instruction set architecture, a vector processor architecture, a very large instruction word architecture. Furthermore, the CPU 1830 can be based on the Von Neuman model or the Harvard model. The CPU 1830 can be a digital signal processor, an FPGA, an ASIC, a PLA, a PLD, or a CPLD. Further, the CPU 1830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 18, the data processing system 1800 can include that the SB/ICH 1820 is coupled through a system bus to an I/O Bus, a read only memory (ROM) 1856, universal serial bus (USB) port 1864, a flash binary input/output system (BIOS) 1868, and a graphics controller 1858. PCI/PCIe devices can also be coupled to SB/ICH 1888 through a PCI bus 1862.

The PCI devices may include, for example, Ethernet adapters, add-in cards, and PC cards for notebook computers. The Hard disk drive 1860 and CD-ROM 1866 can use, for example, an integrated drive electronics (IDE) or serial advanced technology attachment (SATA) interface. In one implementation the I/O bus can include a super I/O (SIO) device.

Further, the hard disk drive (HDD) 1860 and optical drive 1866 can also be coupled to the SB/ICH 1820 through a system bus. In one implementation, a keyboard 1870, a mouse 1872, a parallel port 1878, and a serial port 1876 can be connected to the system bus through the I/O bus. Other peripherals and devices that can be connected to the SB/ICH 1820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 20:
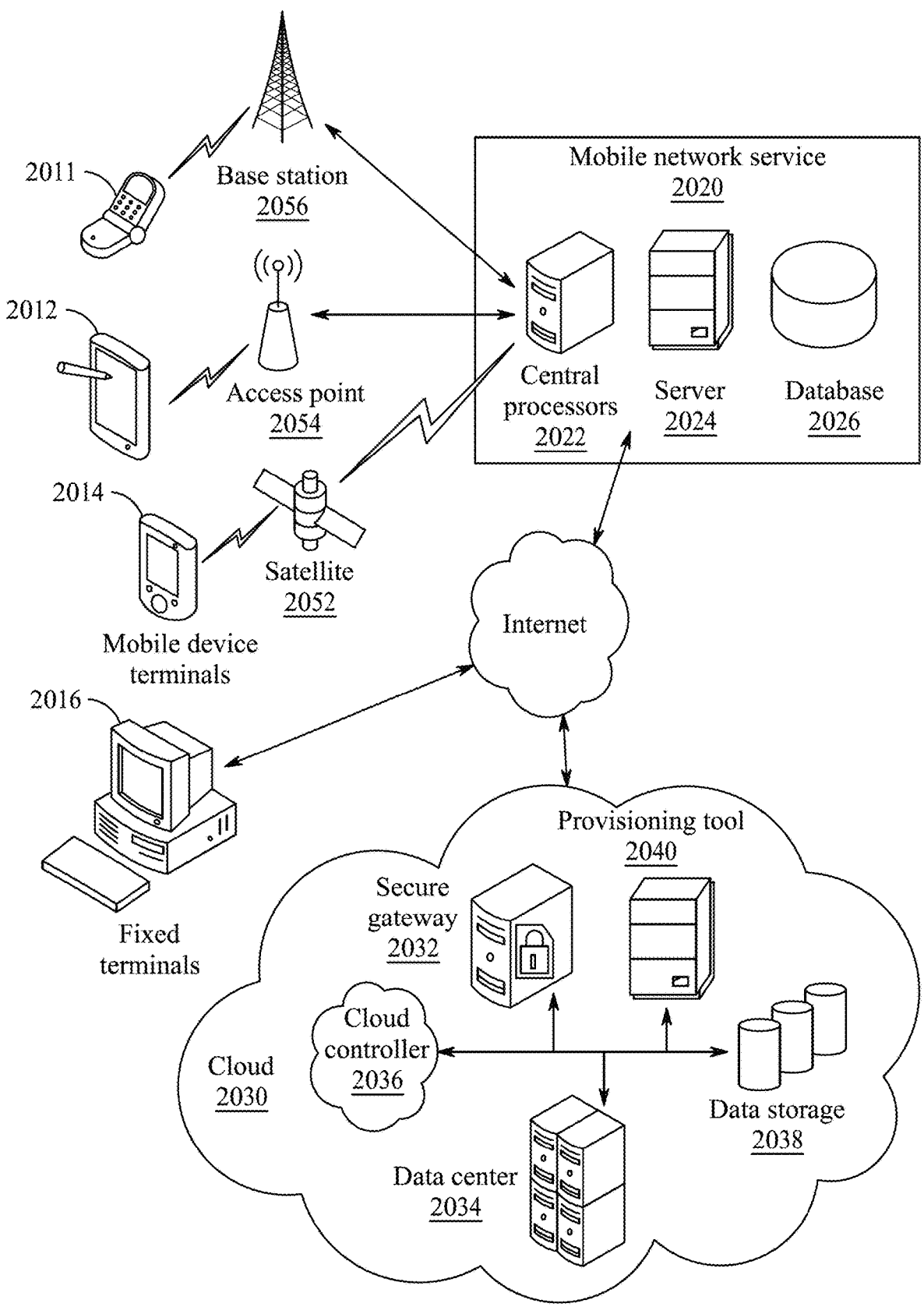
FIG. 20 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 2030 including a cloud controller 2036, a secure gateway 2032, a data center 2034, data storage 2038 and a provisioning tool 2040, and mobile network services 2020 including central processors 2022, a server 2024 and a database 2026, which may share processing, as shown by FIG. 20, in addition to various human interface and communication devices (e.g., display monitors 2016, smart phones 2010, tablets 2012, personal digital assistants (PDAs) 2014). The network may be a private network, such as a LAN, satellite 2052 or WAN 2054, or be a public network, may such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A hybrid free space acoustic oscillator system for sensing perturbations in a free space region, comprising:
   an acoustic transmitter configured to transmit a series of signals at a preset oscillation frequency into the free space region;
   a sample under test located in the free space region, wherein the series of signals are phase shifted from the preset oscillation frequency by perturbations of the sample under test;
   an acoustic receiver configured to receive the phase shifted series of signals and convert the phase shifted series of signals to electrical signals;
   a first feedback loop and a second feedback loop connected between the acoustic receiver and the acoustic transmitter;

a first amplifier located in the first feedback loop, wherein the first amplifier is configured to receive the electrical signals and amplify the electrical signals by a gain value A;

a bandpass filter connected to the first amplifier, wherein the bandpass filter is configured to filter the amplified the electrical signals of the first feedback loop to a desired frequency band;

a first phase shifter connected to the bandpass filter, wherein the first phase shifter is configured to inject a first phase shift into the amplified electrical signals of the first feedback loop, wherein the first phase shift is configured to adjust a frequency of the amplified electric signals to the desired frequency band;

a second phase shifter located in the second feedback loop, wherein the second phase shifter is configured inject a second phase shift into the second feedback loop, wherein the second phase shift is configured to adjust the preset oscillation frequency to a new oscillation frequency to compensate for the phase shifts in the preset oscillation frequency induced by the sample under test;

a second amplifier connected to the second phase shifter, wherein the second amplifier is configured to amplify the electrical signals of the second feedback loop phase shifted by the second phase shifter; and a detector connected to the first feedback loop and the second feedback loop, wherein the detector is configured to measure a difference between the preset oscillation frequency and the new oscillation frequency and determine a property of the sample under test.

2. The hybrid free space acoustic oscillator system of claim 1, wherein the acoustic receiver is configured to transmit a first half of the electrical signals into the first feedback loop and transmit a second half of the electrical signals into the second feedback loop.

3. The hybrid free space acoustic oscillator system of claim 2, wherein:

the second amplifier has a fixed gain value K; and the detector is a detector configured to generate a frequency spectrum of the electrical signals of the first half of the electrical signals and the second half of the electrical signals of the second feedback path, determine the difference between the preset oscillation frequency and the new oscillation frequency and determine the property of the sample under test based on the difference.

4. The hybrid free space acoustic oscillator system of claim 3, wherein the sample under test is a gas, the property is a density of the gas, the perturbations in the free space path are due to changes in the density of the gas and the detector is configured to detect the shift in frequency to the new oscillation frequency resulting from the changes in the density of the gas.

5. The hybrid free space acoustic oscillator system of claim 3, wherein the sample under test is air, the property is a temperature of the air, the perturbations in the free space path are due to changes in the temperature of the air and the detector is configured to detect the shift in frequency to the new oscillation frequency resulting from the changes in the temperature of the air.

6. The hybrid free space acoustic oscillator system of claim 2, the second amplifier has a fixed gain value K; and the detector is a mixer configured to compare the new oscillation frequency of the electrical signals of the first half of the electrical signals and the second half of the electrical signals of the second feedback path to a reference frequency.

7. The hybrid free space acoustic oscillator system of claim 6, wherein the sample under test is a gas, the property is a density of the gas, the perturbations in the free space path are due to changes in the density of the gas and the mixer is configured to output a frequency shift between the reference frequency and the new oscillation frequency resulting from the changes in the density of the gas.

8. The hybrid free space acoustic oscillator system of claim 6, wherein the sample under test is air, the property is a temperature of the air, the perturbations in the free space path are due to changes in the temperature of the air and the mixer is configured to output a frequency shift between the reference frequency and the new oscillation frequency resulting from the changes in the temperature of the air.

9. The hybrid free space acoustic oscillator system of claim 1, further comprising:

a summing circuit connected to the acoustic receiver, the first feedback loop and the second feedback loop, wherein the summing circuit is configured to receive the electrical signals from the acoustic receiver and sum the electrical signals from the acoustic receiver with the amplified, second phase shifted electrical signals from the second feedback loop having the new oscillation frequency and inject the sum of the electric signals into the first feedback loop.

10. The hybrid free space acoustic oscillator system of claim 9, wherein the second amplifier has an adjustable gain value 1/a, wherein the gain value 1/a is configured to be adjusted to match the amplitude of the electrical signals in the second feedback loop to an amplitude of the electrical signals in the first feedback loop.

11. The hybrid free space acoustic oscillator system of claim 10, wherein the detector is a detector is connected to the first feedback loop, wherein the detector is configured to generate a spectrum of the summed electrical signals, determine the difference between the preset oscillation frequency and the new oscillation frequency and determine the property of the sample under test based on the difference.

12. The hybrid free space acoustic oscillator system of claim 11, wherein the sample under test is a gas, the property is a density of the gas, the perturbations in the free space path are due to changes in the density of the gas and the detector is configured to detect the shift in frequency to the new oscillation frequency resulting from the changes in the density of the gas.

13. The hybrid free space acoustic oscillator system of claim 11, wherein the sample under test is air, the property is a temperature of the air, the perturbations in the free space path are due to changes in the temperature of the air and the detector is configured to detect the shift in frequency to the new oscillation frequency resulting from the changes in the temperature of the air.

14. The hybrid free space acoustic oscillator system of claim 11, wherein the detector is a mixer connected to the first feedback loop, wherein the mixer is configured to compare the new oscillation frequency of the summed electrical signals to a reference frequency, determine the difference between the reference frequency and the new oscillation frequency to determine a property of the sample under test based on the difference.

15. The hybrid free space acoustic oscillator system of claim 14, wherein the sample under test is a gas, the property is a density of the gas, the perturbations in the free space path are due to changes in the density of the gas and the mixer is configured to output a frequency shift between the reference frequency and the new oscillation frequency resulting from the changes in the density of the gas.

16. The hybrid free space acoustic oscillator system of claim 14, wherein the sample under test is air, the property is a temperature of the air, the perturbations in the free space path are due to changes in the temperature of the air and the mixer is configured to output a frequency shift between the reference frequency and the new oscillation frequency resulting from the changes in the temperature of the air.

17. The hybrid free space acoustic oscillator system of claim 14, wherein the sample under test is a slab located in the free space path, the property is a thickness of the slab, the perturbations in the free space path are due to changes in the thickness of the slab and the mixer is configured to output a frequency shift between the reference frequency and the new oscillation frequency resulting from the changes in the thickness of the slab.

18. The hybrid free space acoustic oscillator system of claim 14, wherein the sample under test is a slab located in the free space path, wherein the slab is oriented at a varying tilt angle to an axis of the free space path, the property is the tilt angle of the slab and the mixer is configured to output a frequency shift between the reference frequency and the new oscillation frequency resulting from changes in the tilt angle of the slab.

19. A method for sensing perturbations in a free space region of a hybrid free space acoustic oscillator system, comprising:
   transmitting, with an acoustic transmitter, a series of signals at a preset oscillation frequency into the free space region;
   phase shifting, by a sample under test located in the free space region, the series of signals from the preset oscillation frequency by perturbations of the sample under test;
   receiving, by an acoustic receiver, the phase shifted series of signals;
   converting, by the acoustic receiver, the phase shifted series of signals to electrical signals;
   connecting a first feedback loop and a second feedback loop between the acoustic receiver and the acoustic transmitter;
   amplifying, by a first amplifier located in the first feedback loop, the electrical signals by a gain value A;
   filtering, with a bandpass filter connected to the first amplifier, the amplified the electrical signals of the first feedback loop to a desired frequency band;
   injecting, by a first phase shifter connected to the bandpass filter, a first phase shift into the amplified electrical signals of the first feedback loop to adjust a frequency of the amplified electric signals to the desired frequency band;
   injecting, by a second phase shifter located in the second feedback loop, a second phase shift into the second feedback loop to adjust the preset oscillation frequency to a new oscillation frequency to compensate for the phase shifts in the preset oscillation frequency induced by the sample under test;
   amplifying, by a second amplifier connected to the second phase shifter, the electrical signals of the second feedback loop phase shifted by the second phase shifter; and
   measuring, by a detector connected to the first feedback loop and the second feedback loop, a difference between the preset oscillation frequency and the new oscillation frequency to determine a property of the sample under test, wherein the detector is one of a detector configured to generate a spectrum of the electrical signals and a mixer configured to compare the new oscillation frequency to a reference signal.

20. The method of claim 19, further comprising at least one of the following:
   detecting, when the sample under test is a gas, the shift from the preset oscillation frequency to the new oscillation frequency resulting from changes in the density of the gas;
   detecting, when the sample under test is air, the shift from the preset oscillation frequency to the new oscillation frequency resulting from changes in the temperature of the air;
   detecting, when the sample is a slab placed in the free space path, a frequency shift between the reference frequency and the new oscillation frequency resulting from the changes in the thickness of the slab; and
   detecting, when the sample is a slab oriented at a varying tilt angle to an axis of the free space path, a frequency shift between the reference frequency and the new oscillation frequency resulting from changes in the tilt angle of the slab.

* * * * *